(12) United States Patent
Yamazaki et al.

(10) Patent No.: US 7,737,054 B2
(45) Date of Patent: Jun. 15, 2010

(54) LASER IRRADIATION APPARATUS, LASER IRRADIATION METHOD, AND METHOD FOR MANUFACTURING A SEMICONDUCTOR DEVICE

(75) Inventors: Shunpei Yamazaki, Setagaya (JP); Koichiro Tanaka, Atsugi (JP)

(73) Assignee: Semiconductor Energy Laboratory Co., Ltd., Atsugi-shi, Kanagawa-ken ( * ) Notice: Subject to any disclaimer, the term of this patent is extended or adjusted under 35 U.S.C. 154(b) by 90 days.

(21) Appl. No.: 11/987,050

(22) Filed: Nov. 27, 2007

(65) Prior Publication Data

US 2008/0132041 A1 Jun. 5, 2008

Related U.S. Application Data

(62) Division of application No. 10/799,626, filed on Mar. 15, 2004, now Pat. No. 7,304,005.

(30) Foreign Application Priority Data

Mar. 17, 2003 (JP) .............................. 2003-071608

(51) Int. Cl.
*H01L 21/00* (2006.01)
(52) U.S. Cl. .................. 438/795; 438/487; 438/166
(58) Field of Classification Search .................. 438/487, 438/166, 795
See application file for complete search history.

(56) References Cited

U.S. PATENT DOCUMENTS

| | | | |
|---|---|---|---|
| 5,643,801 A | 7/1997 | Ishihara et al. | |
| 5,643,826 A | 7/1997 | Ohtani et al. | |
| 5,897,799 A | 4/1999 | Yamazaki et al. | |
| 5,900,980 A | 5/1999 | Yamazaki et al. | |
| 5,923,962 A | 7/1999 | Ohtani et al. | |
| 5,953,597 A | 9/1999 | Kusumoto et al. | |
| 5,959,779 A | 9/1999 | Yamazaki et al. | |

(Continued)

FOREIGN PATENT DOCUMENTS

EP 1 049 144 11/2000

(Continued)

OTHER PUBLICATIONS

Wolf and Tauber, Silicon Processing for the VLSI Era, vol. 1—Process Technology, 2nd Edition, 2000, 8.12.8 Rapid Thermal Processing, pp. 308-310.*

(Continued)

*Primary Examiner*—David Vu
*Assistant Examiner*—Earl N Taylor
(74) *Attorney, Agent, or Firm*—Eric J. Robinson; Robinson Intellectual Property Law Office, P.C.

(57) ABSTRACT

A second laser light of a continuous wave oscillation is irradiated to a region melted by a first laser light of a pulsed oscillation having a harmonic. Specifically, the first laser light has a wavelength not longer than that of visible light (830 nm, preferably not more than 780 nm). The absorption coefficient of the second laser light to a semiconductor film considerably increases because the semiconductor film is melted by the first laser light, and therefore the second laser light becomes easy to be absorbed in the semiconductor film.

14 Claims, 16 Drawing Sheets

U.S. PATENT DOCUMENTS

| | | |
|---|---|---|
| 6,002,523 A | 12/1999 | Tanaka |
| 6,014,401 A | 1/2000 | Godard et al. |
| 6,038,075 A | 3/2000 | Yamazaki et al. |
| 6,156,997 A | 12/2000 | Yamazaki et al. |
| 6,242,292 B1 | 6/2001 | Yamazaki et al. |
| 6,528,397 B1 | 3/2003 | Taketomi et al. |
| 6,544,825 B1 | 4/2003 | Yamazaki |
| 6,548,370 B1 | 4/2003 | Kasahara et al. |
| 6,700,096 B2 | 3/2004 | Yamazaki et al. |
| 6,717,105 B1 | 4/2004 | Okamoto et al. |
| 6,806,498 B2 | 10/2004 | Taketomi et al. |
| 7,056,810 B2 | 6/2006 | Yamazaki et al. |
| 7,067,403 B2 | 6/2006 | Yamazaki et al. |
| 7,125,761 B2 | 10/2006 | Tanaka |
| 7,132,375 B2 | 11/2006 | Yamazaki |
| 7,135,390 B2 | 11/2006 | Tanaka |
| 7,160,764 B2 | 1/2007 | Tanaka |
| 7,498,212 B2 | 3/2009 | Tanaka |
| 7,524,712 B2 | 4/2009 | Tanaka et al. |
| 2004/0069751 A1 | 4/2004 | Yamazaki et al. |
| 2004/0097103 A1 | 5/2004 | Imai et al. |
| 2004/0119955 A1 | 6/2004 | Tanaka |
| 2004/0171237 A1 | 9/2004 | Tanaka et al. |
| 2004/0198028 A1 | 10/2004 | Tanaka et al. |
| 2004/0253838 A1 | 12/2004 | Yamazaki et al. |
| 2005/0252894 A1 | 11/2005 | Imai et al. |
| 2006/0019474 A1 | 1/2006 | Inui et al. |
| 2006/0220211 A1 | 10/2006 | Yamazaki et al. |
| 2006/0237397 A1 | 10/2006 | Yamazaki et al. |
| 2007/0037332 A1 | 2/2007 | Tanaka |
| 2007/0054479 A1 | 3/2007 | Tanaka |
| 2007/0158315 A1 | 7/2007 | Tanaka et al. |
| 2009/0072162 A1 | 3/2009 | Tanaka |

FOREIGN PATENT DOCUMENTS

| | | |
|---|---|---|
| JP | 04-124813 | 4/1992 |
| JP | 04-282869 | 10/1992 |
| JP | 07-183540 | 7/1995 |
| JP | 07-187890 | 7/1995 |
| JP | 08-148423 A | 6/1996 |
| JP | 11-307450 A | 11/1999 |
| JP | 11-340160 | 12/1999 |
| JP | 2000-068520 | 3/2000 |
| JP | 2000-286209 A | 10/2000 |
| JP | 2002-141301 | 5/2002 |
| JP | 2002-217125 A | 8/2002 |
| JP | 2002-261015 A | 9/2002 |
| JP | 2002-289524 | 10/2002 |

OTHER PUBLICATIONS

Search Report and Written Opinion dated Aug. 3, 2005 from The Danish Patent and Trademark Office, for Application No. 2003-07418-4.

* cited by examiner

FIG. 2
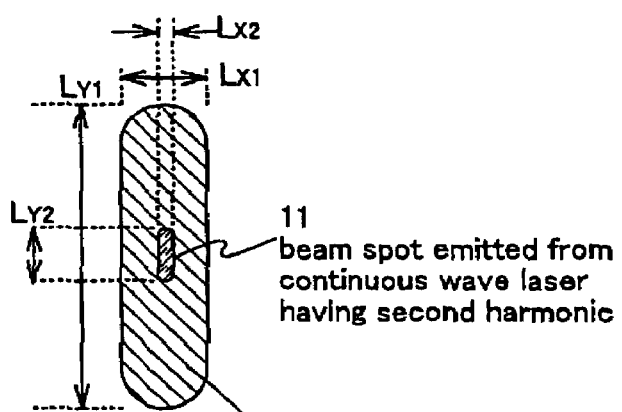
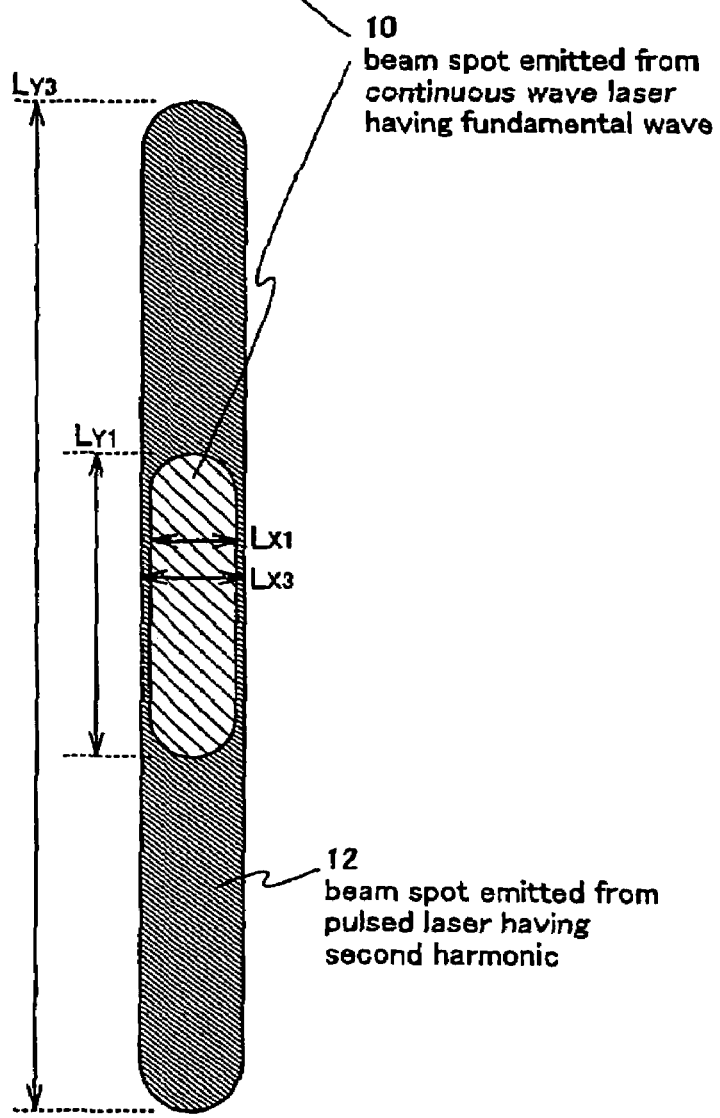

FIG. 8
(A)
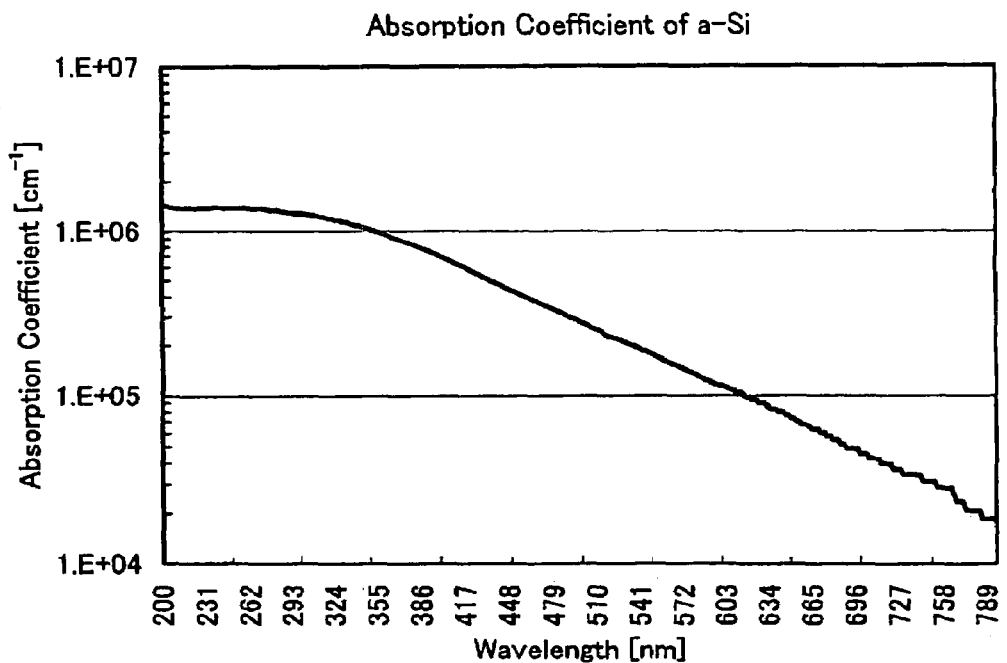
(B)
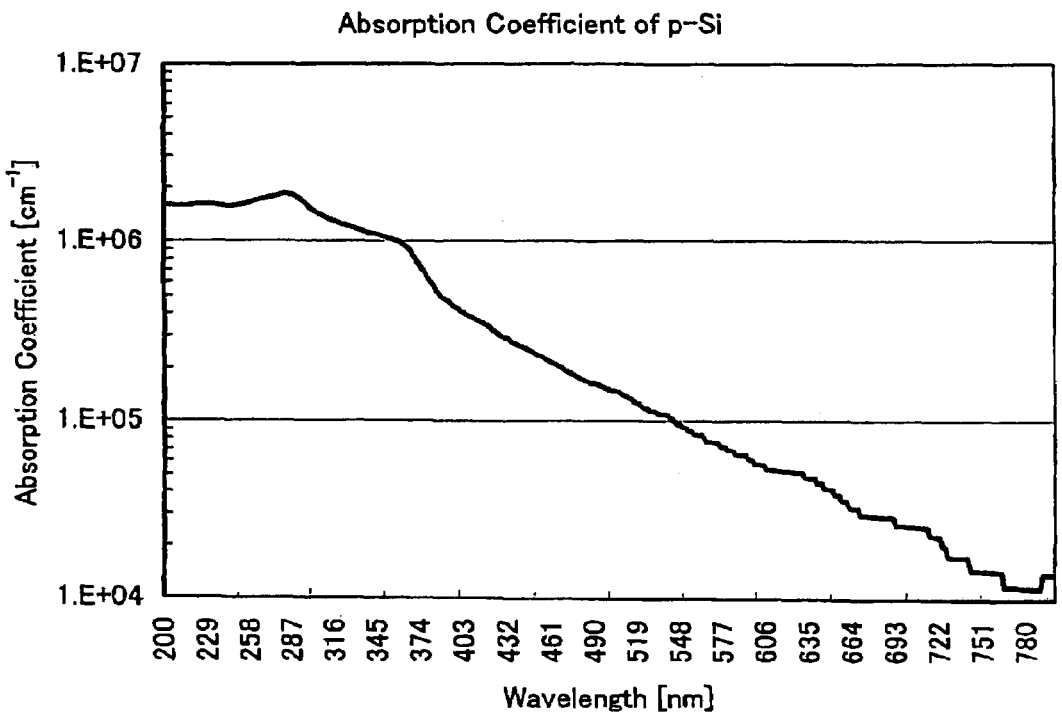

FIG. 12
(A)
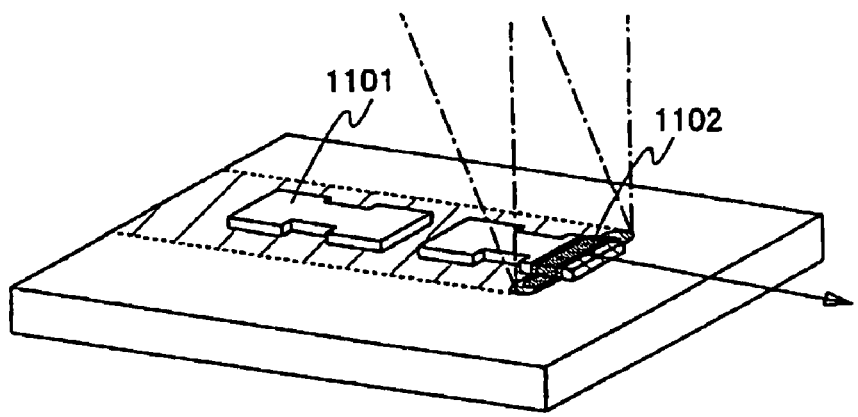
(B)
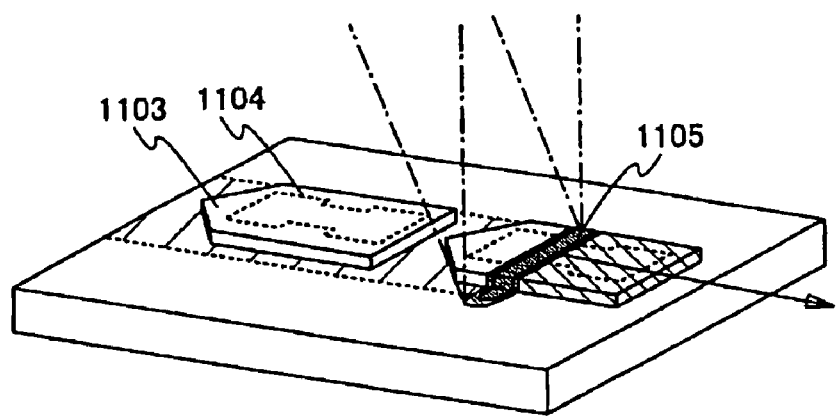

FIG. 13
(A)
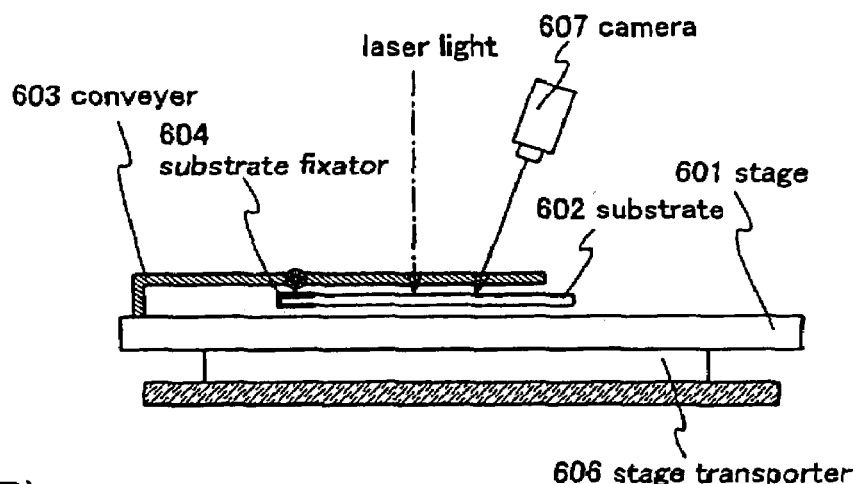
(B)
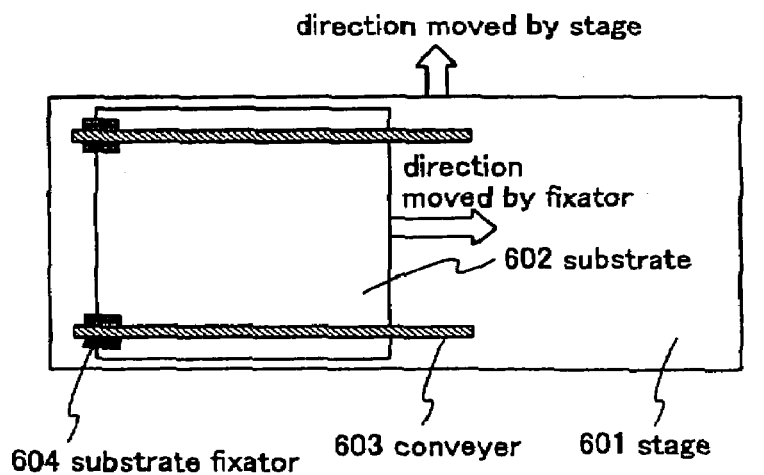
(C)
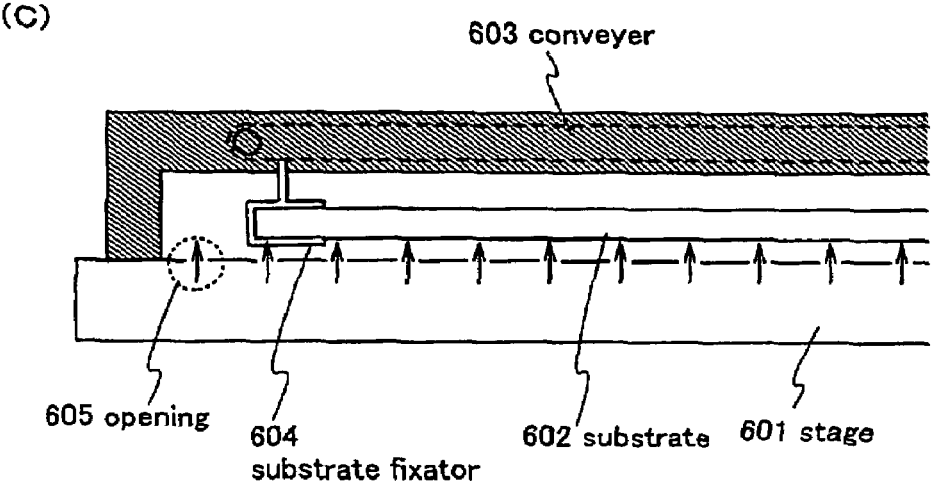

FIG. 14
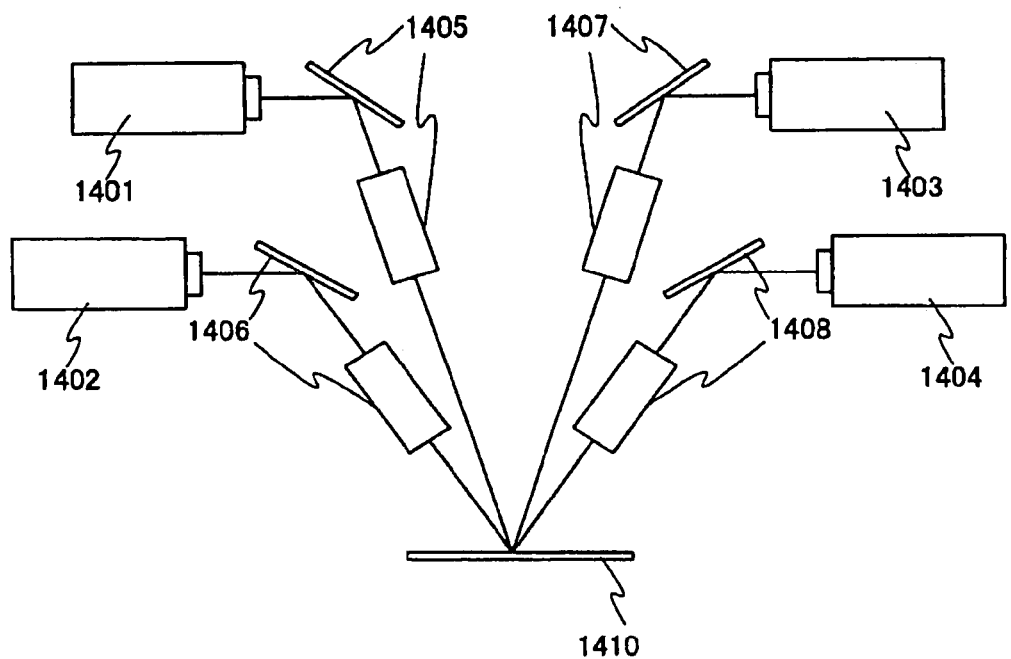
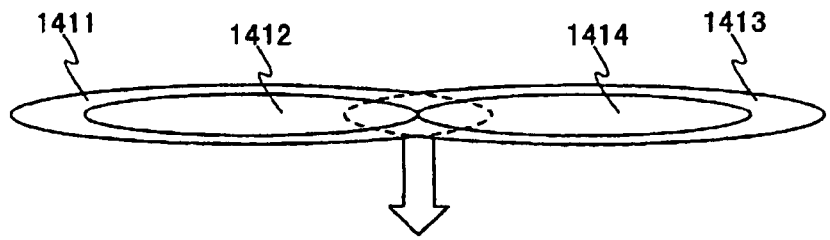

LASER IRRADIATION APPARATUS, LASER IRRADIATION METHOD, AND METHOD FOR MANUFACTURING A SEMICONDUCTOR DEVICE

BACKGROUND OF THE INVENTION

1. Field of the Invention

The present invention relates to a laser irradiation apparatus used for crystallizing a semiconductor film. In addition, the present invention relates to a laser irradiation method and a method for manufacturing a semiconductor device with the use of the laser irradiation apparatus.

2. Description of Related Art

A thin film transistor using a poly-crystalline semiconductor film (poly-crystalline TFT) is superior to TFT using an amorphous semiconductor film in mobility by double digits or more, and thereby has an advantage that a pixel portion and its periphery driver circuit in a semiconductor display device can be integrally formed on the same substrate. The poly-crystalline semiconductor film can be formed over an inexpensive glass substrate by using a laser annealing method.

Lasers are generally classified into two types of a pulsed laser and a continuous wave laser according to the oscillation method. The output energy of the pulsed laser typified by an excimer laser per unit of time is higher by three to six digits than that of the continuous wave laser. Therefore, throughput can be enhanced by shaping a beam spot (a region irradiated by the laser light in fact on the surface of the processing object) into a rectangular spot having a length of several cm on a side or into a linear spot having a length of 100 mm or more through an optical system and by irradiating the laser light to the semiconductor film effectively. For this reason, the pulsed laser has become popular to be employed for crystallizing the semiconductor film.

It is noted that the term "linear" herein used does not refer to a line in a strict sense but to a rectangle (or an oblong) having a large aspect ratio. For example, the rectangular spot having an aspect ratio of 2 or more (preferably in the range of 10 to 10000) is referred to as linear. It is noted that the linear is still included in the rectangular.

However, the semiconductor film thus crystallized using the pulsed laser light includes a plurality of crystal grains assembled and the position and the size of the crystal grain are random. Compared to an inside of the crystal grain, a boundary between the crystal grains (crystal grain boundary) has an amorphous structure and an infinite number of recombination centers and trapping centers existing due to a crystal defect or the like. There is a problem that when a carrier is trapped in the trapping center, potential of the crystal grain boundary increases to become a barrier against the carrier, and thereby lowering a transporting characteristic of the carrier.

In view of the above problem, recently, attention has been paid to the technique of irradiating the continuous wave laser light to the semiconductor film. In this technique, the continuous wave laser is scanned in one direction so as to grow crystals continuously toward the scanning direction and to form a plurality of crystal grains including single-crystal grains extending long in the scanning direction. It is considered that this technique can form a semiconductor film having few crystal grain boundaries at least in a channel direction of TFT.

By the way, it is preferable that the absorption coefficient of the laser light to the semiconductor film is high because the higher the absorption coefficient is, the more effectively the semiconductor film can be crystallized. The absorption coefficient depends on the material and the like of the semiconductor film. In case of using a YAG laser or a $YVO_4$ laser to crystallize the silicon film having a thickness from several tens to several hundreds nm which is generally employed for the semiconductor device, the second harmonic having a shorter wavelength than the fundamental wave is much higher in the absorption coefficient. Therefore, the harmonic is usually used in the crystallization process and the fundamental wave is rarely used.

However, the output power of the laser light converted into the harmonic is lower than that of the fundamental wave. Therefore, it is difficult to enhance the throughput by enlarging the area of the beam spot. Particularly, since the output power of the continuous wave laser per unit of time is lower than that of the pulsed laser, the throughput becomes lower. For example, when a Nd: YAG laser is used, the conversion efficiency from the fundamental wave (wavelength: 1064 nm) to the second harmonic (wavelength: 532 nm) is about 50%. Moreover, the nonlinear optical element converting the laser light into the harmonic does not have enough resistance against the laser light. For example, the continuous wave YAG laser can emit the fundamental wave having an output as high as 10 kW, while it can emit the second harmonic having an output as low as 10 W. Therefore, in order to obtain necessary energy density for crystallizing the semiconductor film, the area of the beam spot must be narrowed to approximately $10^{-3}$ $mm^2$, and therefore the continuous wave YAG laser is inferior to the pulsed excimer laser in terms of throughput.

It is noted that in opposite ends of the beam spot in the direction perpendicular to the scanning direction, there is formed a region where the crystal grain is extremely small and where the crystallinity is inferior compared with the center of the beam spot. Even though a semiconductor element is formed in such a region, a high characteristic cannot be expected. Therefore, it is important to reduce the proportion of the region where the crystallinity is inferior in the whole region irradiated by the laser light in order to relax the restriction in the layout of the semiconductor element.

Moreover, in the surface of the region where a microcrystal is formed in the vicinity of the edge of the beam spot, there are formed concavity and convexity (ridge) having the height which is nearly equal to the thickness of the semiconductor film. Therefore, in the case of TFT for example, it is difficult to uniform the thickness of the gate insulating film formed so as to contact the active layer, and this makes it difficult to thin the gate insulating film. For this reason, there is a problem that miniaturization of TFT and the other semiconductor element is interrupted.

BRIEF SUMMARY OF THE INVENTION

Problems to be Solved by the Invention

In view of the above-mentioned problems, it is an object of the present invention to provide a laser irradiation apparatus which can broaden the area of the beam spot drastically, decrease the proportion of the region having the inferior crystallinity, and suppress the formation of the ridge. Moreover, it is an object of the present invention to provide a laser irradiation apparatus which can also enhance the throughput while using the continuous wave laser light. Furthermore, it is an object of the present invention to provide a laser irradiation method and a method for manufacturing a semiconductor device with the use of the laser irradiation apparatus.

Means to Solve the Problem

In the laser irradiation method of the present invention, the second laser light generated in a continuous wave oscillation is irradiated to the region melted by the first laser light of a harmonic generated in a pulse oscillation. Specifically, the first laser light has a wavelength not longer than that of visible light (830 nm, preferably not longer than 780 nm). Since the semiconductor film is melted by the first laser light, the absorption coefficient of the second laser light to the semiconductor film drastically increases and this makes it easy for the second laser light to be absorbed in the semiconductor film.

FIG. 8(A) shows the value of the absorption coefficient ($cm^{-1}$) of an amorphous silicon film to the wavelength (nm) of the laser light. In addition, FIG. 8(B) shows the value of the absorption coefficient ($cm^{-1}$) of a poly-crystalline silicon film to the wavelength (nm) of the laser light. It is noted that these values are calculated based on the extinction coefficient obtained from a spectroscopic ellipsometer. When the semiconductor film has an absorption coefficient not less than $1 \times 10^4$ $cm^{-1}$, it is considered that the first laser light can melt the semiconductor film sufficiently. Therefore, in order to obtain the absorption coefficient not less than $1 \times 10^4$ $cm^{-1}$, in case of the amorphous silicon film, it is desirable that the first laser light has a wavelength of not more than 780 nm. It is noted that the relationship between the absorption coefficient and the wavelength of the first laser light depends on the material, crystallinity, and the like of the semiconductor film. Therefore, the wavelength of the first laser light is not limited to this, and the wavelength of the first laser light may be determined appropriately so that the absorption coefficient becomes not less than $1 \times 10^4$ $cm^{-1}$.

The laser irradiation apparatus according to the present invention comprises a first laser oscillator generating a pulse oscillation of first laser light having a wavelength not longer than that of the visible light and a second laser oscillator generating a continuous wave oscillation of second laser light of the fundamental wave. The shapes and the positions of the beam spot of the first laser light and the beam spot of the second laser light are controlled by a first and a second optical system respectively. And the beam spots of the first laser light and second laser light are overlapped one another by these two optical systems. In addition, the laser irradiation apparatus according to the present invention has means for controlling the positions of the beam spot of the first laser light and the beam spot of the second laser light relative to the processing object.

This moves the region melted by the first laser light in the semiconductor film while keeping its melting state by the irradiation of the second laser light generated in a continuous wave oscillation. Therefore, the crystal grain grown toward the scanning direction continuously is formed. By forming the single-crystal grain extending long along the scanning direction, the semiconductor film having few crystal grain boundaries at least in the channel direction of TFT can be formed.

The time for which the melting state can be kept depends on the balance between the output of the pulsed laser and that of the continuous wave laser. When the next pulsed laser is irradiated to the semiconductor film within the time frame for which the melting state can be kept, the annealing of the semiconductor film can be continued while keeping its melting state. In the extreme case, it is possible to find a condition in which once the semiconductor film is melted by the pulsed laser, only the irradiation of the laser light of fundamental is enough to keep its melting state. In such a case, after the pulsed laser is irradiated for only one shot, the continuous wave laser may be irradiated to keep the melting state.

It is noted that the higher harmonic has the lower output power. Therefore, when the first laser light has the fundamental wavelength of approximately 1 μm, the second harmonic is the most preferable to be used. However, the present invention is not limited to this, and the first laser light may have a wavelength not longer than that of the visible light. In addition, since the second laser light is irradiated for the purpose of assisting energy to the first laser light, the output power is emphasized rather than the absorption coefficient to the semiconductor film. Therefore, the fundamental wave is the most desirable as the second laser light. However, the present invention is not limited to this, and not only the fundamental wave but also the harmonic can be employed as the second laser light.

When the fundamental wave is employed as the second laser light, it is not necessary to convert the wavelength. Therefore, the output power does not need to be decreased in consideration of the deterioration of the nonlinear optical element. For example, it is possible that the second laser light is output with the energy of 100 times or more (1000 W or more, for example) compared to the continuous wave laser light having a wavelength not longer than that of the visible light. Therefore, a cumbersome procedure of maintenance of the nonlinear optical element is not necessary any more and the total energy of the laser light absorbed in the semiconductor film can be increased so that the crystal having a larger grain size can be obtained.

It is noted that there are two ways for overlapping the first beam spot obtained by the first laser light generated in a pulse oscillation and the second beam spot obtained by the second laser light generated in a continuous wave oscillation according to the magnitude relation of the beam spots. First of all, the case is explained in which two beam spots are overlapped in such a way that the second beam spot falls within the first beam spot.

The energy of the pulsed laser light per unit of time is higher than that of the continuous wave laser light. In addition, when the harmonic and the fundamental wave are compared, the energy of the harmonic is lower than that of the fundamental wave. In the present invention, it is noted that the laser light having the harmonic or having a wavelength not longer than that of the visible light is generated in a pulse oscillation. And the laser light having the fundamental wave is generated in a continuous wave oscillation. When the first beam spot of the harmonic and the second beam spot of the fundamental wave are overlapped in such a way that the second beam spot falls within the first beam spot, the region in which the beam spots of the harmonic and the fundamental wave are overlapped can be enlarged compared with the structure where both laser light of the harmonic and the fundamental wave are generated in a continuous wave oscillation, and the structure where the laser light of the harmonic is generated in a continuous wave oscillation while the laser light of a fundamental wave is generated in a pulse oscillation.

An overlapping of the two beam spots formed by two laser is explained as taking a continuous wave YAG laser and a pulsed excimer laser for example.

FIG. 2(A) shows an aspect in which a beam spot 10 emitted from the continuous wave YAG laser having a fundamental wave and a beam spot 11 emitted from the continuous wave YAG laser having the second harmonic are overlapped. The YAG laser having the fundamental wave can provide an output power approximately 10 kW. On the other hand, the YAG laser having the second harmonic can provide an output power of approximately 10 W.

When 100% of the output power of the laser light is assumed to be absorbed in the semiconductor film, it is possible to enhance the crystallinity of the semiconductor film by setting the energy density of the laser light in the range of 0.01 to 100 MW/cm². Therefore, the energy density here is set to 1 MW/cm².

And when it is assumed that the beam spot 10 emitted from the continuous wave YAG laser having the fundamental wave has a rectangular shape, that the length of the minor axis is $L_{X1}$, and that the length of the major axis is $L_{Y1}$, in order to satisfy the condition of the energy density described above, $L_{X1}$ is set in the range of 20 µm to 100 µm. For example, it is appropriate that when $L_{X1}$ is 20 µm, $L_{Y1}$ is set to approximately 50 mm, and that when $L_{X1}$ is 30 µm, $L_{Y1}$ is set to approximately 30 mm.

On the other hand, when it is assumed that the beam spot 11 emitted from the continuous wave YAG laser having the harmonic has a rectangular shape, that the length of the minor axis is $L_{X2}$, and that the length of the major axis is $L_{Y2}$, in order to satisfy the condition of the energy density described above, $L_{X2}$ is set in the range of 20 µm to 100 µm. For example, it is appropriate that when $L_{X2}$ is 10 µm, $L_{Y2}$ is set to approximately 100 µm.

When it is assumed that the beam spot 10 emitted from the continuous wave YAG laser having the fundamental wave completely overlaps the beam spot 11 emitted from the continuous wave YAG laser having the second harmonic, the area of the beam spot 11 corresponds to the area of the region in which the beam spot 10 and the beam spot 11 are overlapped.

Next, FIG. 2(B) shows an aspect in which the beam spot 10 emitted from the continuous wave YAG laser having the fundamental wave and a beam spot 12 emitted from the pulsed excimer laser are overlapped. The pulsed excimer laser can output an energy of approximately 1 J per a pulse. And when the pulse width is set to approximately 30 nsec, the output per unit of time becomes 30 MW. Therefore, when it is assumed that the beam spot 12 emitted from the pulsed excimer laser has a rectangular shape, that the length of the minor axis is $L_{X3}$, and that the length of the major axis is $L_{Y3}$, in order to satisfy the condition of the energy density described above, it is appropriate that $L_{X3}$ is set in the range of 20 µm to 500 µm. For example, when $L_{X3}$ is 400 µm, it is appropriate that $L_{Y3}$ is set to approximately 300 mm.

It is noted that the major axis of each beam spot can be extended up to 15 cm or 30 cm by optimizing each condition such as the energy density, the scanning speed, or the like.

When it is assumed that the beam spot 10 emitted from the continuous wave YAG laser having the fundamental wave completely overlaps the beam spot 12 emitted from the pulsed excimer laser, the area of the beam spot 10 corresponds to the area of the region in which the beam spot 10 and the beam spot 12 are overlapped. Therefore, it is possible to broaden the region where two laser light are overlapped to a large degree when the first laser light is generated in a continuous wave oscillation and the second laser light is generated in a pulse oscillation as shown in FIG. 2(B) compared with the case where both of the first and the second laser light are generated in a continuous wave oscillation as shown in FIG. 2(A). Thus, the throughput can be more enhanced.

Next, the case is explained in which the first beam spot of the harmonic generated in a pulse oscillation and the second beam spot of the fundamental wave generated in a continuous wave oscillation are overlapped in such a way that the first beam spot falls within the second beam spot.

FIG. 1(A) shows a shape of the first beam spot 901 and a top view of a semiconductor film 902 crystallized only by scanning the first beam spot 901. FIG. 1(A) also shows energy distribution of the laser light absorbed in the semiconductor film 902 in the direction of the major axis of the first beam spot 901. It is noted that the semiconductor film is crystallized by scanning the first beam spot 901 in the direction perpendicular to the direction of the major axis of the first beam spot 901 as shown with a white arrow.

The first beam spot 901 is rectangular in FIG. 1(A), and the energy thereof is kept at a constant in the center and in a certain range of its vicinity. For example, however, when the first beam spot has an elliptical shape, the energy distribution draws a normal curve. In any case, the energy distribution of the first beam spot 901 is generally higher toward the center from the edge. And, the semiconductor film 902 is crystallized in the part thereof overlapped by the region of the beam spot 901 having higher energy than the energy $E_A$, which is the necessary energy for melting the semiconductor film.

The semiconductor film 902 crystallized by only the first beam spot 901 includes a plurality of crystal grains assembled as shown in FIG. 1(A). Although the position and the size of the crystal grain are random, a crystal grain having a diameter of approximately 1 µm tends to be obtained because the energy of the first beam spot 901 is higher (specifically higher than the energy $E_B$) toward the center thereof and therefore the semiconductor film completely melts in a region 903 of the center and its vicinity. On the contrary, in a region 904 of the vicinity of the edge where the energy is low (the region having the energy not more than $E_B$), the region not completely melted is partially left. Therefore, the crystal grain as large as that in the region 903 of the center and its vicinity cannot be obtained and only the crystal grain having a comparatively small grain size (microcrystal) tends to be formed. It is noted that the energy $E_B$ is higher than the energy $E_A$ and is lower than the energy $E_C$, which is the highest energy in the first beam spot 901.

The region 904 where the microcrystal is formed in the vicinity of the edge is not appropriate to be used as the semiconductor element because the transporting characteristic of the carrier is low due to the trapping center or the recombination center caused by the defect of the grain boundary. Therefore, it is desirable that the region 904 with the microcrystal formed is small because the restriction of the layout of the semiconductor element can be relaxed. However, since the first beam spot 901 has the region where the energy is higher than $E_A$ and lower than $E_B$, it is difficult to make the region 904 with the microcrystal formed small only by adjusting the optical system.

Next, FIG. 1(B) shows shapes of the first beam spot 901 and the second beam spot 911, and a top view of the semiconductor film 912 crystallized by scanning both of the first beam spot 901 and the second beam spot 911. FIG. 1(B) also shows the energy distribution of the laser light absorbed in the semiconductor film 912 in the direction of the major axes of the first beam spot 901 and the second beam spot 911. It is noted that the semiconductor film 912 is crystallized by scanning the first beam spot 901 and the second beam spot 911 in the direction perpendicular to the direction of the major axes thereof as indicated with a white arrow.

The second beam spot 911 overlaps the first beam spot 901 so as to cover it completely in FIG. 1(B). Although the fundamental wave having a wavelength of approximately 1 µm is hardly absorbed in the semiconductor film of a solid phase, the absorption coefficient to a semiconductor film of the liquid phase is 1000 times higher than that of the solid phase and therefore the fundamental wave is easy to be absorbed. For this reason, in the case of FIG. 1(B), the energy of the second laser light of the fundamental wave is absorbed only in a part of the semiconductor film where the energy of the first beam spot 901 is higher than the energy $E_A$, which is the necessary energy for melting the semiconductor film. Therefore, in the region where the energy of the first laser light is higher than the energy $E_A$, the total energy of the laser light absorbed in the semiconductor film 912 becomes higher discontinuously than in the other region as shown by a continuous line in FIG. 1(B).

In addition, since the second laser light is generated in a continuous wave oscillation, the part of the semiconductor film melted by the first laser light moves in the semiconductor film by the irradiation of the second laser light generated in a continuous wave oscillation while keeping its melting state. Therefore, a crystal grain grown continuously toward the scanning direction is formed. Thus, it is possible to form a region 913 including a crystal having a large grain size (a large crystal region) in the part of the semiconductor film 912 irradiated by the region of the first beam spot 901 having high energy discontinuously. Specifically, it is possible to form the large crystal region 913 in which the crystal grain has a width from 10 to 30 μm in the scanning direction and a width from 1 to 5 μm in the direction perpendicular to the scanning direction.

In addition, in the case of FIG. 1(B), a region 914 including only the microcrystal without any large crystal grains is formed in the vicinity of the edge as well as in the case of FIG. 1(A). This region cannot be eliminated completely because it is formed by the heat conduction from the region 913 when the laser is irradiated. However, it is possible to make the region 914 as small as possible by selecting a condition of the laser irradiation appropriately. Therefore, compared with the case of FIG. 1(A), it is possible to increase the proportion of the large crystal grain region 913 and to relax the restriction of the layout of the semiconductor element.

In addition, convexity and concavity (ridge) having the height which is nearly equal to the thickness of the semiconductor film are formed on the surface of the region 904 where microcrystal is formed in the vicinity of the edge in FIG. 1(A). In this embodiment, it is possible to make the region where microcrystal is formed in the vicinity of the edge as small as possible. In addition, the height of the ridge can be made a half of the film thickness or less, and moreover, it can be made a quarter of it or less under the more optimum condition. For example, when the semiconductor film has a thickness of 100 nm, the height of the ridge can be made 50 nm or less, and it can be made 20 nm or less under the more optimum condition with which a semiconductor element having superior characteristic can be manufactured.

In addition, when only the pulsed laser light is used in the crystallization, the impurity such as oxygen, nitrogen, or carbon tends to segregate in the grain boundary of the crystal. When the crystallization using the laser light is combined with the crystallization using the catalyst metal, the catalyst metal not completely gettered may segregate. In the present invention, since the second laser light can increase the total energy of the laser light absorbed in the semiconductor film, it is possible to keep the time long from melting the semiconductor film until solidifying it. Therefore, like a zone melting method, the impurity having a positive segregation coefficient can be prevented from segregating. Moreover, purify of the semiconductor film and uniformalization of the concentration of the dissolved substance can be preformed. Therefore, the characteristic of the semiconductor element using the semiconductor film can be improved, and moreover, the variation of the characteristic can be suppressed.

As described above, an advantageous effect to be obtained is different according to the magnitude relation between the first beam spot and the second beam spot. It is the most desirable that the first beam spot is enlarged in accordance with the shape of the second beam spot to the maximum within the size of the second beam spot. In the ultimate sense, the two beam spots are completely overlapped. This makes it possible to obtain the merits of both.

In addition, when a plurality of the second beam spots generated in a continuous wave oscillation are chained and overlapped with the first laser light generated in a pulse oscillation, the width of the large crystal grain region can be further broadened in the direction perpendicular to the scanning direction. Moreover, a plurality of the first beam spots generated in a pulse oscillation may be chained. With the above structure, the restriction on the layout of the semiconductor element can be more relaxed. In addition, the throughput in the crystallization by the laser light can be more enhanced.

It is noted that when the beam spot is shaped into linear, the width of the region in which the crystal grain crystallized in the scanning direction is assembled can be made as broad as possible in the direction of the major axis of the beam spot. In other words, it may be said that the proportion of the area of the region having the inferior crystallinity formed in opposite ends of the major axis in the whole beam spot can be decreased. In the present invention, however, the shape of the beam spot is not limited to linear and the laser light may have a rectangular shape or a planar shape when sufficient annealing can be performed to the irradiated object.

It is noted that the first laser light is emitted from a laser selected from the group consisting of an Ar laser, a Kr laser, an excimer laser, a $CO_2$ laser, a YAG laser, a $Y_2O_3$ laser, a $YVO_4$ laser, a YLF laser, a $YAlO_3$ laser, a glass laser, a ruby laser, an alexandrite laser, a Ti: Sapphire laser, a copper vapor laser, and a gold vapor laser, each of which is a pulse oscillation.

In addition, the second laser light is emitted from a laser selected from the group consisting of an Ar laser, a Kr laser, a $CO_2$ laser, a YAG laser, a $Y_2O_3$ laser, a $YVO_4$ laser, a YLF laser, a $YAlO_3$ laser, an alexandrite laser, a Ti: Sapphire laser, and a helium cadmium laser, each of which is a continuous wave oscillation.

In addition, in the crystallization step of the semiconductor film by the continuous wave laser, the throughput can be enhanced when the semiconductor film is crystallized by shaping the beam spot into elliptical or rectangular extending long in one direction and by scanning it in the direction of the minor axis of the beam spot. The beam spot is shaped into elliptical because the original shape of the laser light is circular or near circular. The laser light whose original shape is rectangular may be also used after transforming the laser light by expanding it in one direction through a cylindrical lens or the like so that the major axis thereof becomes longer. Alternatively, a plurality of beam may be shaped into elliptical or rectangular extending long in one direction respectively and they may be chained to form a longer beam extending long in one direction so as to enhance the throughput.

ADVANTAGEOUS EFFECT OF THE INVENTION

In the present invention, a semiconductor film is melted by irradiating the first laser light having a wavelength not longer than that of the visible light generated in a pulse oscillation, which is easy to be absorbed in the semiconductor film, and the absorption coefficient of the fundamental wave is increased. Since the first laser light is generated in a pulse oscillation, the area of the beam spot can be made much broader than that when the laser light is generated in a continuous wave oscillation. And when the second laser light having the fundamental wave is irradiated in the melted state, the second laser light is absorbed efficiently in the semiconductor film where the absorption coefficient of fundamental wave is increased. Therefore, the throughput of the laser crystallization can be enhanced because the major axis of the beam spot can be made longer. Moreover, it is effective for relaxing the design rule.

In addition, the scanning of the second laser light can move the region which is melted by the first laser light and in which the absorption coefficient is increased, and therefore the region can be formed in which the crystal grains grown in the scanning direction are paved. Moreover, even after the first laser light stopped to be irradiated, the melted region in which the absorption coefficient is increased can be moved in one direction to some extent by scanning the second laser light.

In addition, since the second laser light has the fundamental wave, it is not necessary to pay attention to the optical damage threshold of the nonlinear optical element used for converting into the harmonic. Therefore, it is possible to obtain the second laser light having considerably high output, for example the laser having the energy 100 times or higher than the harmonic. And, a cumbersome procedure of maintenance due to the change in quality of the nonlinear optical element is not necessary any more. In particular, the present invention can take advantage of the solid-state laser that the maintenance-free condition can be kept long.

In addition, when the first beam spot and the second beam spot are scanned in the same direction in such a way that the first beam spot falls within the second beam spot, the microcrystal region in the vicinity of the edge of the beam spot can be drastically decreased or eliminated as explained in the means to solve the problem.

BRIEF DESCRIPTION OF THE DRAWINGS

FIGS. 2A-2B are drawings illustrating the magnitude relation of the beam spot.

FIGS. 8A-8B are graphs illustrating the relation between the wavelength and the absorption coefficient of the laser light.

FIGS. 12A-12B are drawings illustrating a method for manufacturing a semiconductor device when the laser crystallization is performed after the patterning.

FIGS. 13A-13C are drawings illustrating one embodiment of the means for controlling the position of the substrate.

FIGS. 14A-14B are drawings illustrating the structure of the laser irradiation apparatus of the present invention.

DETAILED DESCRIPTION OF THE INVENTION

Figure 1:
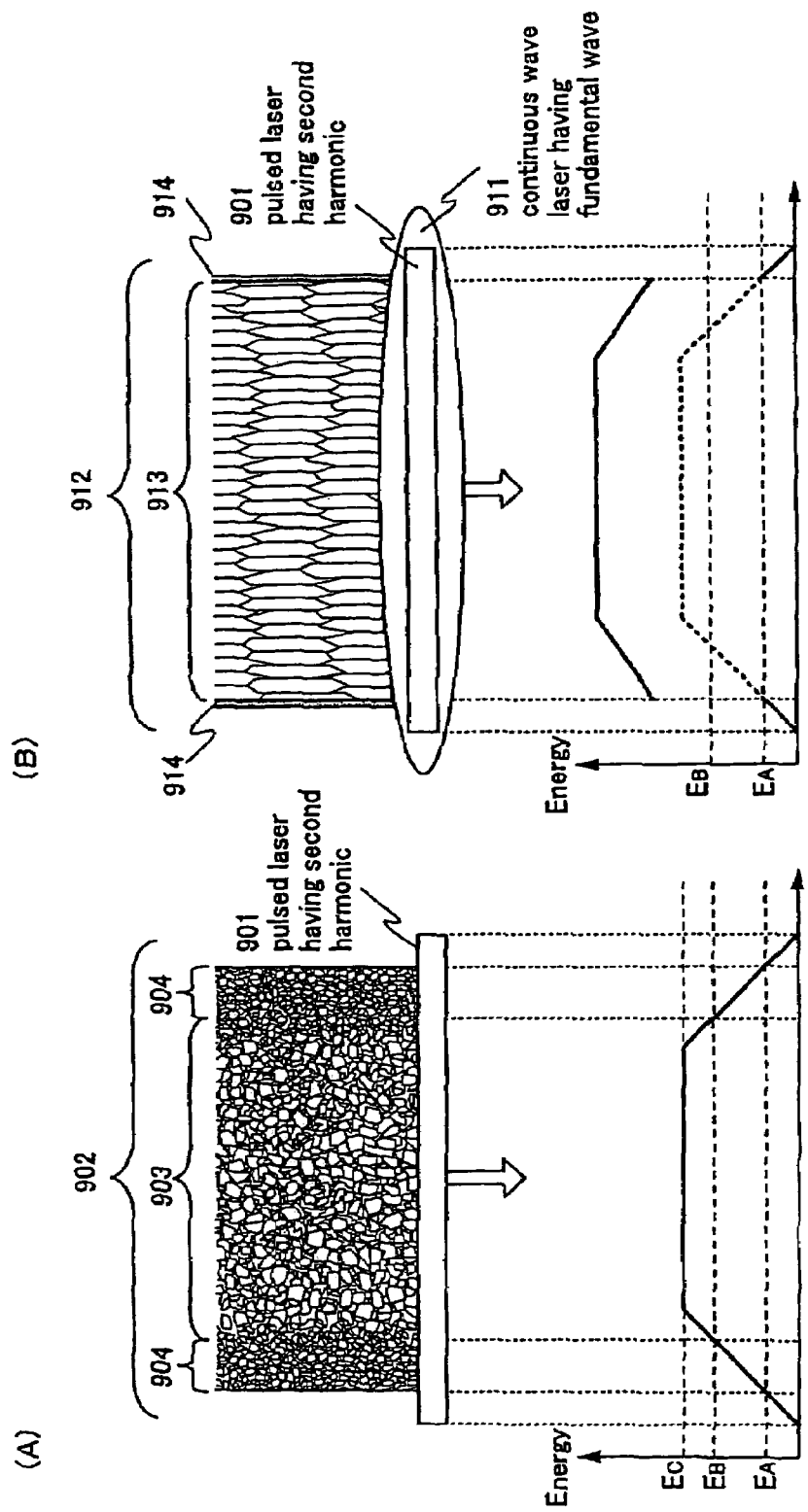
FIGS. 1A-1B are drawings illustrating a beam spot, a crystal state of a semiconductor film, and energy distribution.

Best Modes for Carrying Out the Invention

Embodiment Mode 1

The structure of the laser irradiation apparatus of the present invention is explained with reference to FIG. 3.

A reference numeral 101 denotes a pulsed laser oscillator and a Nd:YLF laser having an output of 6 W is used in the present embodiment mode. The laser oscillator 101 has an oscillation mode of $TEM_{00}$ and the laser light is converted into the second harmonic by a nonlinear optical element. Although it is not in particular necessary to limit to the second harmonic, the second harmonic is superior to the other higher harmonic in terms of energy efficiency. The frequency is 1 kHz and the pulse width is approximately 60 nsec. Although the solid-state laser with an output of approximately 6 W is employed in the present embodiment mode, a large-scale laser having an output as much as 300 W such as a XeCl excimer laser, a KrF excimer laser, or an ArF excimer laser may be also employed. For example, the XeCl excimer laser has a wavelength of 308 nm and the KrF excimer laser has a wavelength of 248 nm.

It is noted that the nonlinear optical element may be provided inside the resonator included in the oscillator or another resonator equipped with the nonlinear optical element may be provided outside the resonator of the fundamental wave. The former structure has an advantage that the apparatus can be made small and therefore the accurate control of the length of the resonator is not necessary any more. On the other hand, the latter structure has an advantage that the interaction of the fundamental wave and the harmonic can be ignored.

As the nonlinear optical element, the crystal whose nonlinear optical constant is relatively large such as KTP ($KTiOPO_4$), BBO ($\beta$-$BaB_2O_4$), LBO ($LiB_3O_5$), CLBO ($CsLiB_6O_{10}$), GdYCOB ($YCa_4O(BO_3)_3$), KDP ($KD_2PO_4$), KB5, $LiNbO_3$, $Ba_2NaNb_5O_{15}$, or the like is used. Particularly, the crystal such as LBO, BBO, KDP, KTP, KB5, CLBO, or the like can increase conversion efficiency from the fundamental wave into the harmonic.

Since the laser light is generally emitted to the horizontal direction, the first laser light emitted from a laser oscillator 101 is reflected by a reflecting mirror 102 and its traveling direction is changed so as to have an angle (incidence angle) of θ1 from the vertical direction. In this embodiment mode, θ1 is set to 21°. The beam spot shape of the first laser light whose traveling direction is changed is transformed by a lens 103 and it is irradiated to a processing object 104. In FIG. 3, the reflecting mirror 102 and the lens 103 correspond to the optical system for controlling the shape and the position of the beam spot of the first laser light.

Figure 3:
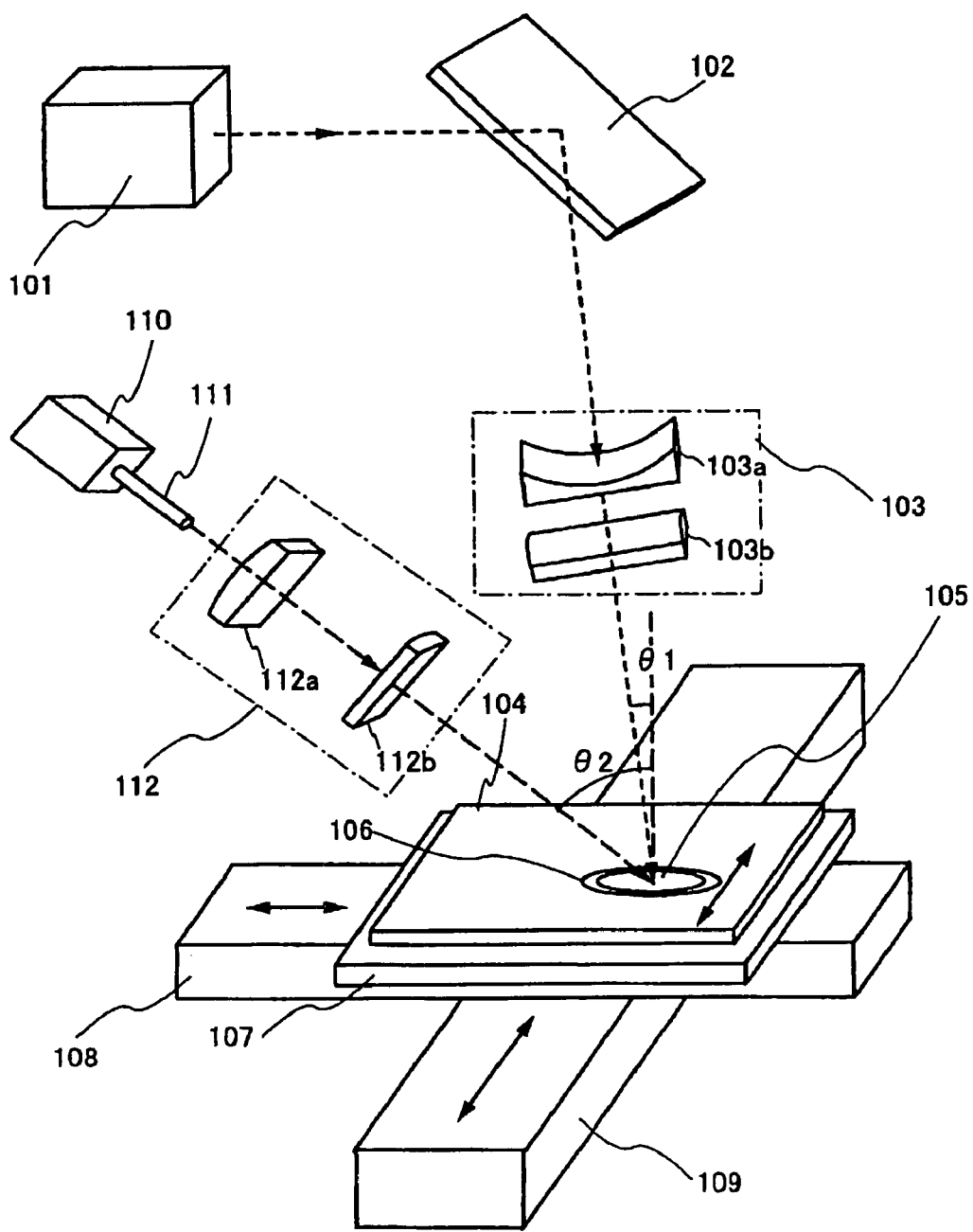
FIG. 3 is a drawing for illustrating the structure of the laser irradiation apparatus of the present invention.

In FIG. 3, a planoconcave cylindrical lens 103a and a planoconvex cylindrical lens 103b are used as the lens 103.

The planoconcave cylindrical lens 103a has a radius of curvature of 10 mm and a thickness of 2 mm, and is positioned 29 mm away from the surface of the processing object 104 along the optical axis when the traveling direction of the first laser light is assumed to be the optical axis. And the generating line of the planoconcave cylindrical lens 103a is made perpendicular to the incidence plane of the first laser light which is incident into the processing object 104.

The planoconvex cylindrical lens 103b has a radius of curvature of 15 mm and a thickness of 2 mm, and is positioned 24 mm away from the surface of the processing object 104 along the optical axis. And the generating line of the planoconvex cylindrical lens 103b is made parallel to the incidence plane of the first laser light which is incident into the processing object 104.

This forms a first beam spot 106 having a size of 3 mm×0.2 mm on the processing object 104.

Moreover, a reference numeral 110 denotes a continuous wave laser oscillator, and a Nd: YAG laser having a fundamental wave (wavelength 1064 nm) and an output of 2 kW is used in this embodiment mode. The second laser light emitted from the laser oscillator 110 is transmitted through an optical fiber 111 of φ300 μm. The optical fiber 111 is positioned so that the exit thereof is directed to have an angle of θ2 to the vertical direction. In this embodiment mode, θ2 is set to 45°. In addition, the exit of the optical fiber 111 is positioned 105 mm away from the processing object 104 along the optical axis of the second laser light emitted from the laser oscillator 110 and the optical axis is made to be included in the incidence plane.

The beam spot of the second laser light emitted from the optical fiber 111 is transformed by a lens 112 and it is irradiated to the processing object 104. In FIG. 3, the optical fiber 111 and the lens 112 correspond to the optical system for controlling the shape and the position of the beam spot of the second laser light.

In FIG. 3, a planoconvex cylindrical lens 112a and a planoconvex cylindrical lens 112b are used as the lens 112.

The planoconvex cylindrical lens 112a has a radius of curvature of 15 mm and a thickness of 4 mm, and is positioned 85 mm away from the surface of the processing object 104 along the optical axis of the second laser light. The direction of the generating line of the planoconvex cylindrical lens 112a is made perpendicular to the incidence plane.

The planoconvex cylindrical lens 112b has a radius of curvature of 10 mm and a thickness of 2 mm, and is positioned 25 mm away from the surface of the processing object 104 along the optical axis of the second laser light.

This forms a second beam spot 105 having a size of 3 mm×0.1 mm on the processing object 104.

In this embodiment mode, the substrate with the semiconductor film formed thereover is set as the processing object 104 so as to be parallel to the horizontal plane. The semiconductor film is formed over the surface of the glass substrate, for example. The substrate with the semiconductor film formed thereover is the glass substrate having a thickness of 0.7 mm, which is fixed on a vacuum suction stage 107 in order not to fall down during the laser irradiation.

The vacuum suction stage 107 can move in XY directions in the parallel plane to the processing object 104 by a uniaxial robot 108 for X axis and a uniaxial robot 109 for Y axis.

It is noted that in case of annealing the semiconductor film formed over the substrate which is transparent to the laser light, in order to realize the uniform irradiation of the laser light, it is desirable that an incidence angle "φ" of the laser light satisfies the inequality of $\phi \geq \arctan(W/2d)$ when an incidence plane is defined as a plane that is perpendicular to the irradiated surface and is including a longer side or a shorter side of the laser light assuming that a shape of the beam is rectangular. In the inequality, "W" is a length of the longer side or the shorter side included in the incidence plane and "d" is a thickness of the substrate which is transparent to the laser light and which is placed at the irradiated surface. In case of using a plurality of laser light, the theory needs to be satisfied with respect to each of the plurality of laser light. It is noted that the incidence angle "φ" is determined by an incidence angle when the track of the laser light is projected to the incidence plane in case that the track is not on the incidence plane. When the laser light is incident at the angle of "φ", it is possible to perform uniform irradiation of the laser light without interference between reflected light from a surface of the substrate and reflected light from a rear surface of the substrate. The above theory is considered assuming that a refractive index of the substrate is 1. In fact, the substrate mostly has a refractive index around 1.5, and a larger calculated value than the angle calculated in accordance with the theory is obtained when the value around 1.5 is considered. However, since the energy of the beam spot is attenuated toward the end of the beam spot, the interference has only a small influence on this part and the value calculated in accordance with the theory is enough to obtain the effect of attenuating the interference. This theory is applied to both of the first laser light and the second laser light, and it is preferable that both of them satisfy the inequality. However, as for the laser light emitted from the excimer laser, for example, whose coherent length is extremely short, the inequality does not need to be satisfied. The above inequality concerning the angle of "φ" is effective only when the substrate is transparent to the laser light.

Generally, the fundamental wave having a wavelength of approximately 1 μm and the second harmonic having a green color transmit through the glass substrate. In order for the present lenses to satisfy the inequality, the positions of the planoconvex cylindrical lens 103b and the planoconvex cylindrical lens 112b are displaced in the direction perpendicular to the incidence plane so as to have incidence angles of φ1 and φ2 respectively in the plane perpendicular to the surface of the processing object 104 including the minor axis of the beam spot. In such a case, the interference does not occur when the first beam spot 106 has an angle φ1 of 10°, and the second beam spot 105 has an angle φ2 of approximately 5°.

In addition, it is desirable that the first laser light and the second laser light are $TEM_{00}$ mode (single mode) obtained from a stable resonator. In case of $TEM_{00}$ mode, since the laser light has Gaussian energy distribution and is superior in focusing property the laser light, it is easy to transform the beam spot.

In the case of using the substrate with the semiconductor film formed thereover as the processing object 104, silicon oxynitride is formed 200 nm in thickness on one surface of the glass substrate having a thickness of 0.7 mm and an amorphous silicon (a-Si) film is formed thereon 70 nm in thickness as a semiconductor film by a plasma CVD method for example. In addition, in order to increase resistance of the semiconductor film against the laser, the thermal annealing is performed to the amorphous silicon film at a temperature of 500° C. for an hour. Instead of the thermal annealing, the crystallization of the semiconductor film using the catalyst metal may be performed. The optimum condition of the laser light irradiation is almost the same to both of the semiconductor film to which the thermal annealing is performed and the semiconductor film crystallized using the catalyst metal.

And the processing object 104 (the substrate with the semiconductor film formed thereover) is scanned in the direction of the minor axis of the second beam spot 105 with the use of the uniaxial robot 109 for Y axis. Here, the output of both laser oscillators 101 and 110 are that of the specification. With the scanning of the processing object 104, the first beam spot 106 and the second beam spot 105 are scanned relatively to the surface of the processing object 104.

Since the region of the semiconductor film irradiated with the first beam spot 106 melts, the absorption coefficient of the second laser light generated in a continuous wave oscillation to the semiconductor film increases considerably. Therefore, in the region having a width from 1 mm to 2 mm corresponding to the major axis of the second beam spot 105 extending long in the scanning direction, single-crystal grains grown in the scanning direction are formed in a paved state.

It is noted that in the region of the semiconductor film where the first beam spot 106 and the second, beam spot 105 are overlapped, the state in which the absorption coefficient is increased by the first laser light of the second harmonic is kept by the second laser light of the fundamental wave. Therefore, even after the first laser light of the second harmonic stopped to be irradiated, the state of the melted semiconductor film where the absorption coefficient is increased is kept by the second laser light of the fundamental wave to be irradiated afterward. Therefore, after the first laser light of the second harmonic stopped to be irradiated, the melted region in which the absorption coefficient is increased can be moved in one direction to some extent by the scanning, and thus the crystal grain grown toward the scanning direction is formed. And in order to keep the region where the absorption coefficient is increased during the process of the scanning continuously, it is desirable that the first laser light of the second harmonic is irradiated again to assist the energy.

It is appropriate that the scanning speed of the first beam spot 106 and the second beam spot 105 is in the range of several cm/s to several hundreds cm/s, and here the scanning speed is set to 50 cm/s.

Figure 4:
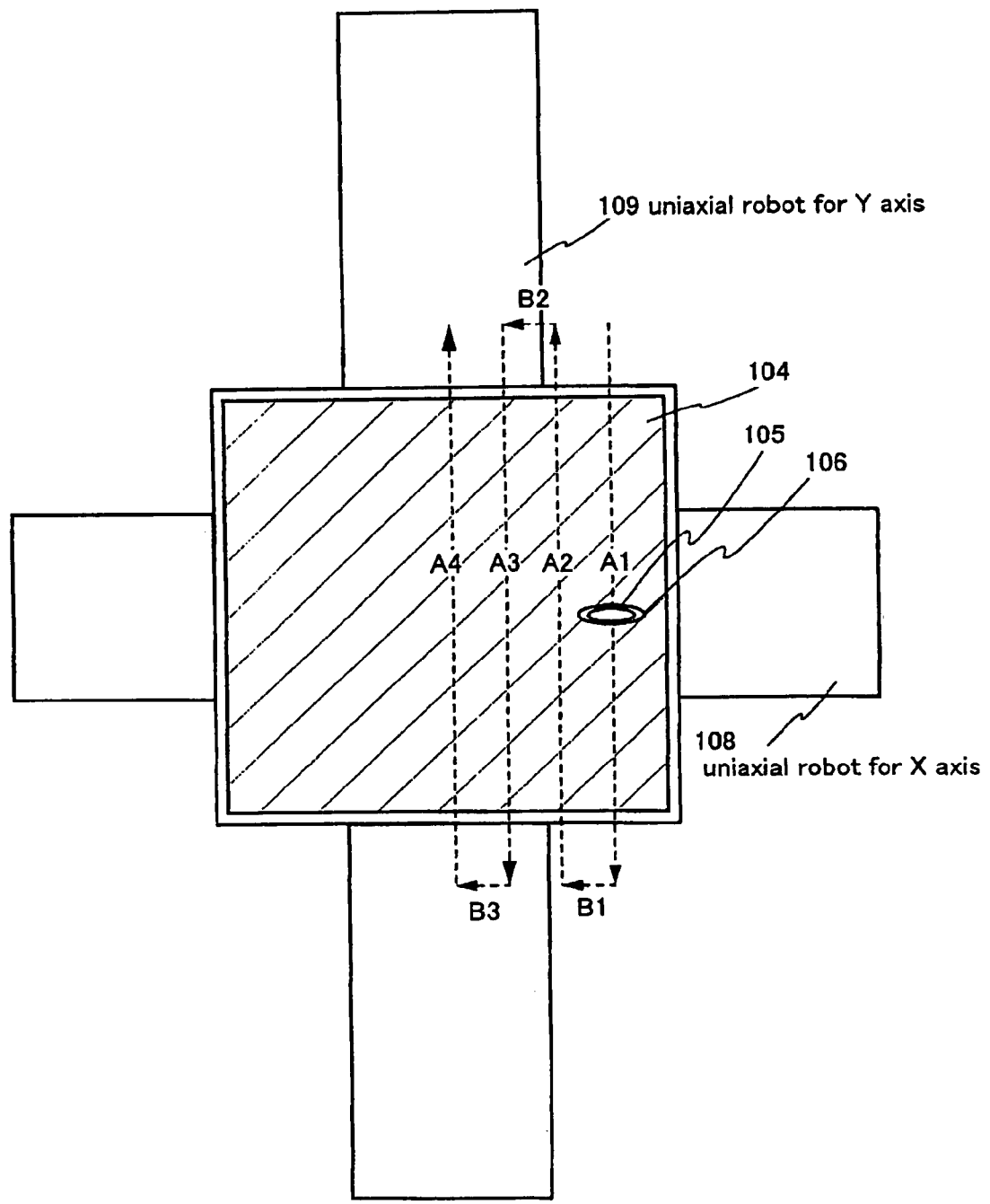
FIG. 4 is a drawing for illustrating the scanning route of the processing object in a laser irradiation method of the present invention.

Next, FIG. 4 shows the scanning route of the first beam spot 106 and the second beam spot 105 on the surface of the processing object 104. In the case that the second laser light is irradiated to the whole surface of the semiconductor film, which is the processing object 104, after the scanning in one direction is performed with the use of the uniaxial robot 109 for Y axis, the first beam spot 106 and the second beam spot 105 are slid with the use of the uniaxial robot 108 for X axis in the direction perpendicular to the direction scanned by the uniaxial robot 109 for Y axis.

For example, the semiconductor film is scanned in one direction at a scanning speed of 50 cm/s by the uniaxial robot 109 for Y axis. In FIG. 4, the scanning route is indicated by a reference character A1. Then, the first beam spot 106 and the second beam spot 105 are slid with respect to the semiconductor film using the uniaxial robot 108 for X axis in the direction perpendicular to the scanning route A1. The scanning route by the slide is indicated by a reference character B1. Next, the semiconductor film is scanned in one direction opposite to the scanning route A1 with the use of the uniaxial robot 109 for Y axis. This scanning route is indicated by a reference character A2. Next, the first beam spot 106 and the second beam spot 105 are slid with respect to the semiconductor film using the uniaxial robot 108 for X axis in the direction perpendicular to the scanning route A2. The scanning route by the slide here is indicated by a reference character B2. By repeating the scanning by the uniaxial robot 109 for Y axis and the uniaxial robot 108 for X axis in order, the second laser light or the first laser light can be irradiated to the whole area of the processing object 104.

It is desirable that the length of the scanning route B1, B2 . . . is in the range of 1 to 2 mm, which corresponds to the length of the major axis of the second beam spot 105.

The region where the crystal grain grown in the scanning direction is formed by the irradiation of the second laser light is very superior in crystallinity. Therefore, when this region is employed as a channel forming region of TFT, extremely high mobility and on-current can be expected. When there is a region in the semiconductor film not requiring such high crystallinity, however, the laser light may not be irradiated thereto. Alternatively, the laser light may be irradiated under the condition where the high crystallinity is not obtained by increasing the scanning speed, for example.

It is noted that there are some methods for scanning the laser light. One is an irradiation system moving method in which the irradiation position of the laser light moves while the substrate as the processing object is fixed. Another one is an object moving method in which the substrate moves while the irradiation position of the laser light is fixed. There is one more method in which these two methods are combined. Since the laser irradiation apparatus according to the present invention includes at least two of the laser light, such as the first laser light and the second laser light, it is the most appropriate to employ the object moving method which can simplify the optical system the most. The laser irradiation apparatus according to the present invention, however, is not limited to this, and it is not impossible to employ any one of the methods described above by devising the optical system. In any case, it is premised that the moving direction of each beam spot relative to the semiconductor film can be controlled.

It is noted that the optical system in the laser irradiation apparatus of the present invention is not limited to that shown in this embodiment mode.

Embodiment Mode 2

Figure 9:
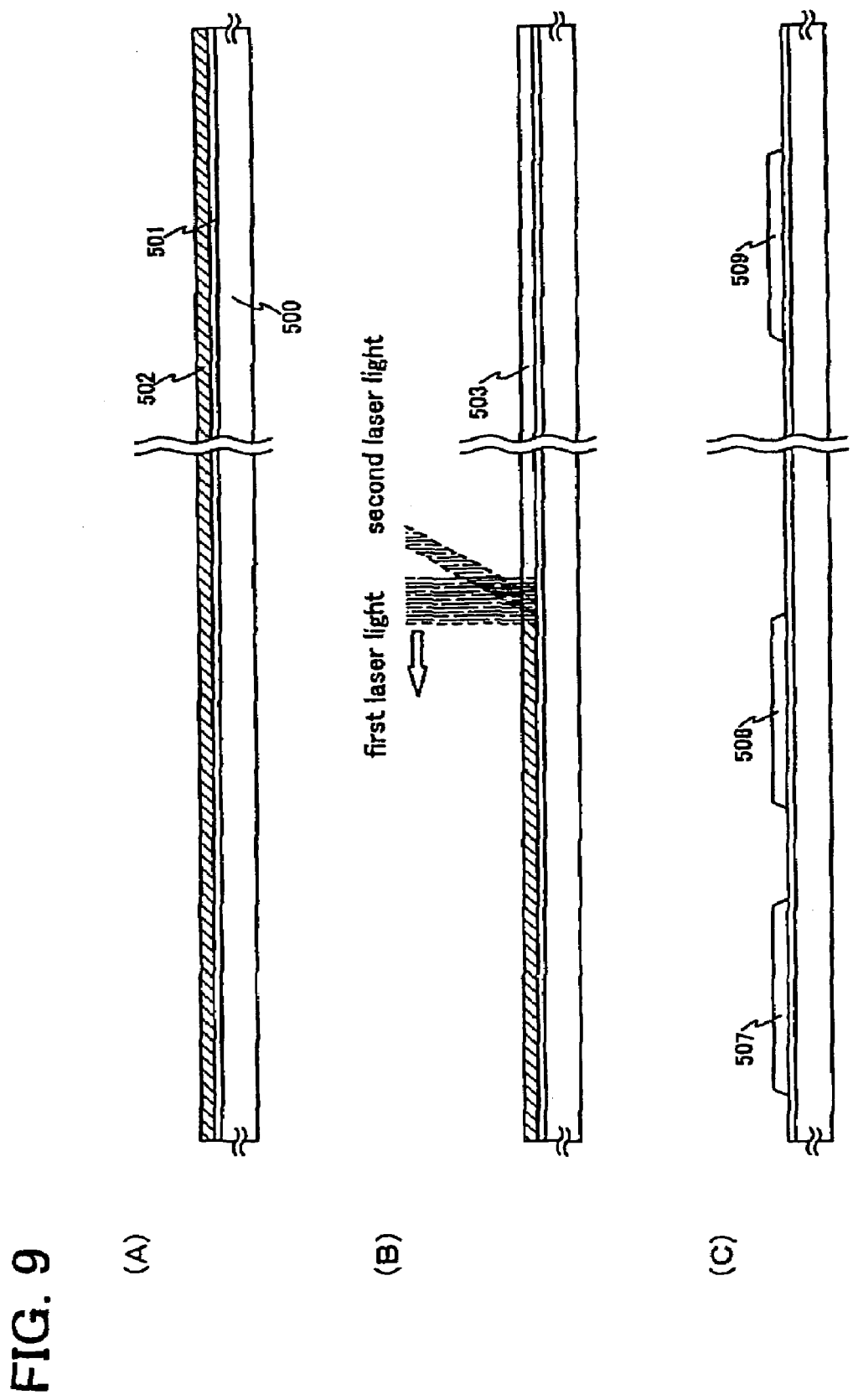
FIGS. 9A-9C are drawings illustrating a method for manufacturing a semiconductor device.

A laser light irradiation method and a method for manufacturing a semiconductor device of the present invention are explained with reference to FIG. 9.

First of all, a base film 501 is formed on a substrate 500 as shown in FIG. 9(A). A glass substrate such as a barium borosilicate glass or an aluminum borosilicate glass, a quartz substrate, an SUS substrate, or the like can be used as the substrate 500. In addition, although the substrate made of flexible synthetic resin such as acryl or plastic typified by PET, PES, or PEN is inferior to the above substrate in terms of the resistance against the heat, the substrate made of flexible synthetic resin can be utilized when it can resist against the heat generated in the manufacturing process.

The base film 501 is provided in order to prevent that alkaline-earth metal or alkaline metal such as Na included in the substrate 500 diffuses to the semiconductor film to have an adverse affect on the characteristic of a semiconductor element. Therefore, the base film 501 is formed of an insulating film such as silicon oxide, silicon nitride, or silicon nitride oxide, which can prevent the diffusion of alkaline metal or alkaline-earth metal to the semiconductor film. In this embodiment mode, a silicon nitride oxide film is formed in a thickness from 10 nm to 400 nm (preferably from 50 nm to 300 nm) by a plasma CVD method.

It is noted that the base film 501 may be formed of a single insulating film or may be formed by laminating a plurality of insulating films. In addition, in the case of using the substrate including the alkaline metal or the alkaline-earth metal at all such as the glass substrate, the SUS substrate, or the plastic substrate, it is effective to provide the base film for the purpose of preventing the diffusion of the impurity. When the diffusion of the impurity does not lead to a significant problem, however, for example when the quartz substrate is used, the base film is not always necessary to be provided.

Next, a semiconductor film 502 is formed on the base film 501. The semiconductor film 502 is formed in a thickness from 25 nm to 100 nm (preferably from 30 nm to 60 nm). It is noted that an amorphous semiconductor may be employed as the semiconductor film 502 and so may a poly-crystalline semiconductor. Not only silicon, but also silicon germanium can be used as the semiconductor. When the silicon germanium is used, the concentration of germanium is preferable in the range of 0.01 atomic % to 4.5 atomic %.

Next, the semiconductor film 502 is crystallized by irradiating the first laser light and the second laser light with the use of the laser irradiation apparatus of the present invention as shown in FIG. 9(B).

In this embodiment mode, the first laser light is YLF laser having an energy of 6 W, an energy per a pulse of 6 mJ/p, a spatial profile of $TEM_{00}$, the second harmonic (527 nm), a pulse repetition rate of 1 kHz, and a pulse width of 60 nsec. It is noted that the first laser light is transformed through the optical system so that the first beam spot formed on the surface of the semiconductor film 502 may become a rectangle having a length of 200 μm in the minor axis and 3 mm in the major axis and the energy density may become 1000 $mJ/cm^2$.

In addition, in this embodiment mode, the second laser light is YAG laser having the fundamental wave (1.064 μm) and a power of 2 kW. It is desirable that the output power of the laser oscillator oscillating the second laser light is in the range of 500 W to 5000 W. The second laser light is transformed through the optical system so that the second beam spot formed on the surface of the semiconductor film 502 may become a rectangle having a length of 100 μm in the minor axis and 3 mm in the major axis and the energy density may become 0.7 $MW/cm^2$.

Then, the first beam spot and the second beam spot are irradiated so as to be overlapped each other on the surface of the semiconductor film 502 and they are scanned in the direction indicated with a white arrow in FIG. 9(B). Since the semiconductor film is melted by the first laser light, the absorption coefficient of the fundamental wave increases and therefore the energy of the second laser light is easily absorbed in the semiconductor film. And since the melted region moves in the semiconductor film by the irradiation of the second laser light of a continuous wave oscillation, the crystal grain grown continuously in the scanning direction is formed. By forming the single-crystal grain extending long along the scanning direction, it is possible to form the semiconductor film having few crystal grain boundaries at least in the channel direction of TFT.

Moreover, the laser light may be irradiated in the atmosphere of the inert gas such as noble gas or nitrogen. This can suppress the roughness of the surface of the semiconductor film due to the irradiation of the laser light. Furthermore, the variation of the threshold value due to the variation of the interface state density can be suppressed.

A semiconductor film 503 in which the crystallinity is more enhanced is formed by irradiating the laser light to the semiconductor film 502 as described above.

Next, as shown in FIG. 9(C), the semiconductor film 503 is patterned to form island-shaped semiconductor films 507 to 509, and various kinds of semiconductor elements typified by TFT are formed using the island-shaped semiconductor films 507 to 509.

When TFT is manufactured for example, a gate insulating film (not shown in the figure) is formed so as to cover the island-shaped semiconductor films 507 to 509. Silicon oxide, silicon nitride, silicon nitride oxide, or the like can be employed as the gate insulating film. As for the film-forming method, a plasma CVD method, a sputtering method, or the like can be employed.

Then, a gate electrode is formed by forming a conductive film on the gate insulating film and patterning it. Then a source region, a drain region, an LDD region, and the like are formed by adding the impurity imparting n-type or p-type conductivity to the island-shaped semiconductor films 507 to 509 using the gate electrode and the resist to be formed and patterned as a mask.

TFT can be thus formed through a series of these processes. It is noted that the method for manufacturing a semiconductor device of the present invention is not limited to the above processes for manufacturing TFT after forming the island-shaped semiconductor films. By employing the semiconductor film crystallized using the laser light irradiation method of the present invention as an active layer of TFT, the variation of the mobility, the threshold value, and the on-current between the elements can be suppressed.

The conditions for irradiating the first laser light and the second laser light are not limited to those shown in this embodiment mode.

For example, the first laser light may be YAG laser having a power of 4 W, an energy per a pulse of 2 mJ/p, a spatial profile of $TEM_{00}$, the second harmonic (532 nm), a pulse repetition rate of 1 kHz, and a pulse width of 30 nsec. Alternatively the first laser light may be $YVO_4$ laser having a power of 5 W, a power per a pulse of 0.25 mJ/p, a spatial profile of $TEM_{00}$, the third harmonic (355 nm), a pulse repetition rate of 20 kHz, and a pulse width of 30 nsec. Furthermore, the first laser light may be $YVO_4$ laser having a power of 3.5 W, a power per a pulse of 0.233 mJ/p, a spatial profile of $TEM_{00}$, the fourth harmonic (266 nm), a pulse repetition rate of 15 kHz, and a pulse width of 30 nsec.

On the other hand, the second laser light may be Nd: YAG laser having a power of 500 W and the fundamental wave (1.064 μm). Alternatively, the second laser light may be Nd: YAG laser having a power of 2000 W and the fundamental wave (1.064 μm).

Moreover, the crystallizing process with the use of the catalyst element may be provided before the crystallization by the laser light. Although nickel (Ni) is used as the catalyst element, the other element such as germanium (Ge), iron (Fe), palladium (Pd), tin (Sn), lead (Pb), cobalt (Co), platinum (Pt), copper (Cu), or gold (Au) can be used. When the crystallizing process by the laser light is performed after the crystallizing process using the catalyst element, the crystal formed in the crystallization by the catalyst element remains without being melted by the irradiation of the laser light in the side closer to the substrate, and the crystallization is promoted by having the crystal as its crystal nucleus. Therefore, the crystallization by the irradiation of the laser light is likely to be promoted uniformly from the side of the substrate to the surface of the semiconductor film. Compared to the case in which the semiconductor film is crystallized only by the laser light, it is possible to enhance the crystallinity of the semiconductor film further and to suppress the roughness of the surface of the semiconductor film after the crystallization by the laser light. Therefore, the variation of the characteristics of the semiconductor element to be formed afterward typified by TFT can be more suppressed and the off-current can be also suppressed.

It is noted that the crystallization may be performed in such a way that the heating process is performed after the catalyst element is added in order to promote the crystallization and then the laser light is irradiated in order to enhance the crystallinity further. Alternatively, the heating process may be omitted. Specifically, after adding the catalyst element, the laser light may be irradiated to the semiconductor film instead of the heating process so as to enhance the crystallinity.

Although this embodiment mode showed the example in which the laser irradiation method of the present invention is employed to crystallize the semiconductor film, the laser irradiation method of the present invention can be also employed to activate the impurity element doped in the semiconductor film.

The method for manufacturing a semiconductor device of the present invention can be applied to manufacture an integrated circuit and a semiconductor display device. Particularly when the present invention is applied to the semiconductor element such as the transistor provided in the pixel portion of the semiconductor display device such as a liquid crystal display device, a light-emitting device having a light-emitting element, typically an organic light-emitting element, equipped in each pixel, a DMD (Digital Micromirror Device), a PDP (Plasma Display Panel), or an FED (Field Emission Display), it can be suppressed that the horizontal stripe appears to be visible in the pixel portion due to the variation of the energy distribution of the laser light to be irradiated.

EMBODIMENT

Embodiments of the present invention are hereinafter explained.

Embodiment 1

This embodiment explains one mode of the laser irradiation apparatus of the present invention.

Figure 5:
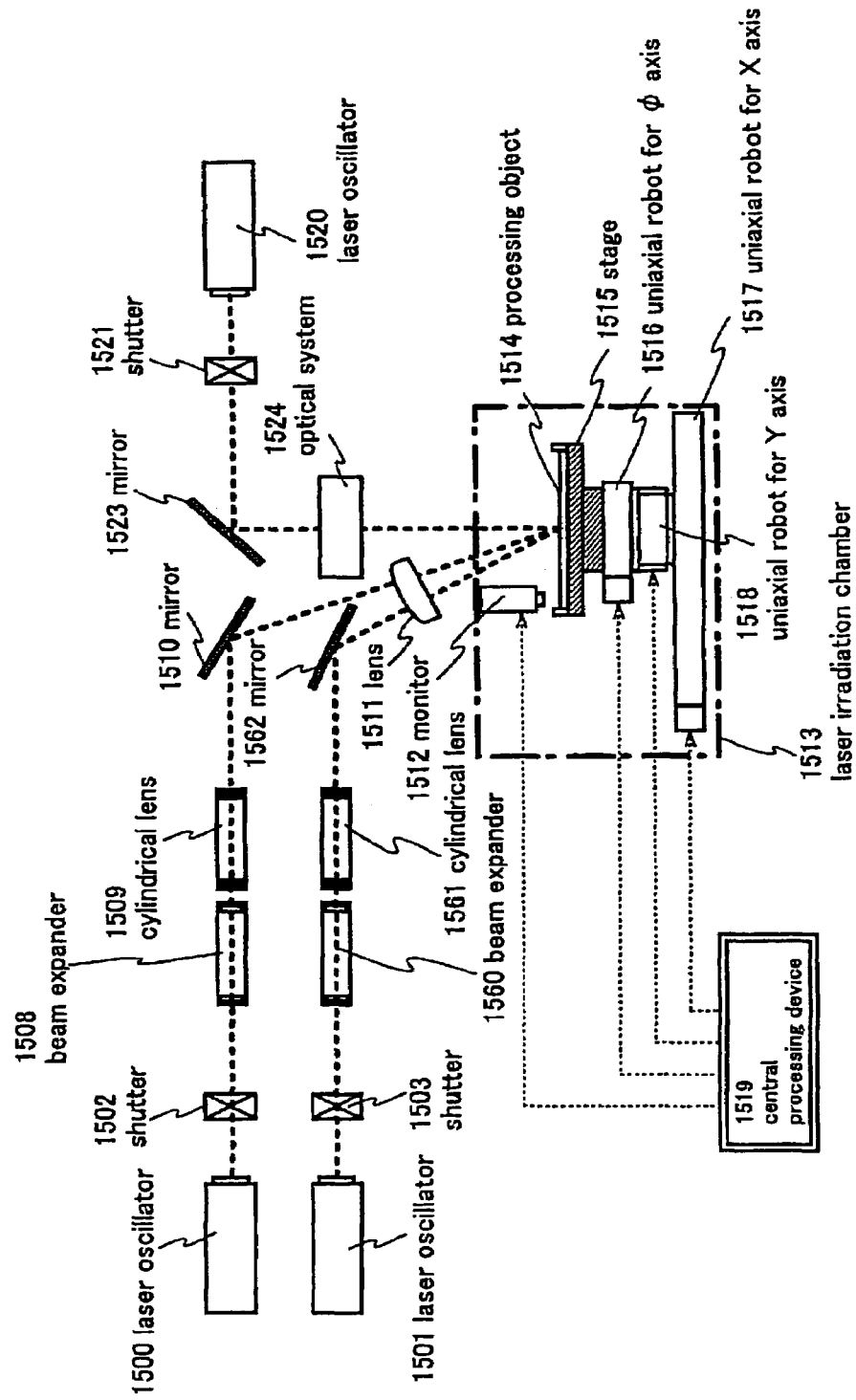
FIG. 5 is a drawing for illustrating the structure of the laser irradiation apparatus of the present invention.

FIG. 5 shows a structure of the laser irradiation apparatus of this embodiment. In this embodiment, first laser light having a wavelength not longer than that of the visible light is generated in a pulse oscillation from a laser oscillator 1520. And second laser light are generated in a continuous wave oscillation from two laser oscillators 1500 and 1501.

In this embodiment, an excimer laser is used as the laser oscillator 1520. The output power per a pulse is set to 1 J, and the pulse width is set to approximately 30 nsec, that is to say, the output per unit of time is set to 30 MW. In addition, both of the laser oscillators 1500 and 1501 are YAG lasers in which the output energy is set to 10 kW respectively.

After the first laser light emitted from the laser oscillator 1520 is reflected by a mirror 1523, the first laser light is shaped into rectangular, elliptical, or linear through an optical system 1524 and it is irradiated to a processing object 1514. It is noted that in this embodiment, a shutter 1521 for blocking the first laser light is provided between the laser oscillator 1520 and the mirror 1523 though the shutter 1521 is not always necessary to be provided. Moreover, the optical system 1524 may be whatever can condense the beam spot into linear, rectangular, or elliptical and can homogenize the energy distribution thereof.

On the other hand, the second laser light emitted from the laser oscillators 1500 and 1501 are incident into beam expanders 1508 and 1560 respectively. In this embodiment, a shutter 1502 for blocking the second laser light is provided between the laser oscillator 1500 and the beam expander 1508. And a shutter 1503 for blocking the second laser light is provided between the laser oscillator 1501 and the beam expander 1560. However, the shutters 1502 and 1503 are not always necessary to be provided.

And the beam expanders 1508 and 1560 can suppress the divergence of the second laser light being incident thereinto and can adjust the size of the sectional shape of the beam.

The second laser light emitted from the beam expanders 1508 and 1560 are extended respectively through the cylindrical lenses 1509 and 1561 so that the sectional shape of the beam may become rectangular, elliptical, or linear. And the extended second laser light are reflected by mirrors 1510 and 1562 respectively and both are incident into a lens 1511. The incident laser light are condensed so as to become linear through the lens 1511 and are irradiated to the processing object 1514 in a laser irradiation chamber 1513. Although a cylindrical lens is used as the lens 1511 in this embodiment, any other lens that can shape the beam spot into rectangular, elliptical, or linear may be employed as the lens 1511.

In this embodiment, the mirror 1523 and the optical system 1524 correspond to the optical system dealing with the first laser light. On the other hand, the beam expanders 1508 and 1560, the cylindrical lenses 1509 and 1561, and the mirrors 1510 and 1562 correspond to the optical system dealing with the second laser light. With these two optical systems, it is possible to overlap the first beam spot formed by the first laser light on the surface of the processing object 1514 and the second beam spot formed by the second laser light on the surface of the processing object 1514.

Figure 7:
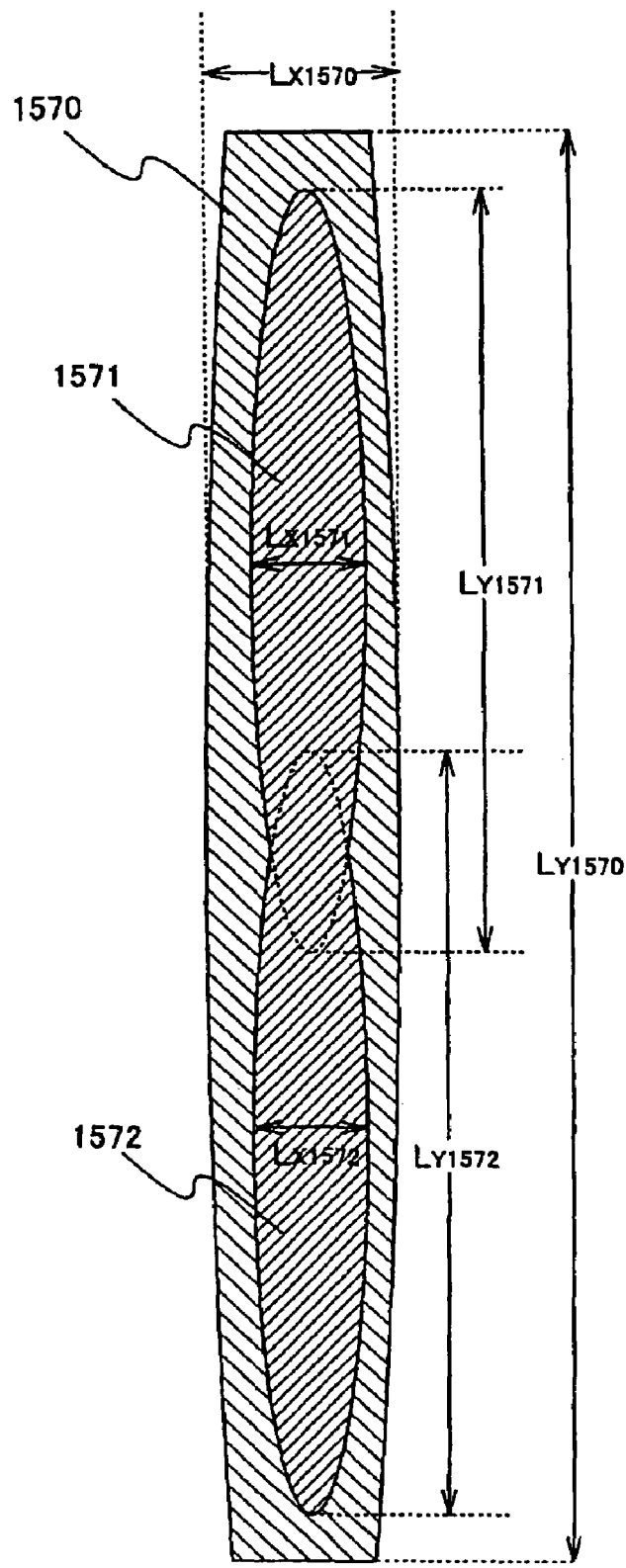
FIG. 7 is a drawing for illustrating the beam spot used in the laser irradiation apparatus shown in FIG. 5.

FIG. 7 shows an example of the shape of each beam spot and its layout used in the laser irradiation apparatus shown in FIG. 5. In FIG. 7, a reference numeral 1570 denotes the first beam spot and reference numerals 1571 and 1572 denote the second beam spots respectively. In FIG. 7, the second beam spots 1571 and 1572 are overlapped partially one another so that the major axes thereof match. And the first beam spot 1570 overlaps the second beam spots 1571 and 1572 so as to cover them completely.

In this embodiment, the length $L_{x1570}$ of the minor axis of the first beam spot 1570 is set to 400 µm, the length $L_{y1570}$ of the major axis thereof is set to 110 mm, and the energy density thereof is set to approximately 25 MW/cm$^2$. When this value is converted into the energy density per a pulse, it is appropriate in the range of 100 to 1000 mJ/cm$^2$. In addition, the length $L_{x1572}$ of the minor axis of the second beam spot 1572 is set to 200 µm, the length $L_{y1572}$ of the major axis thereof is set to 60 mm, and the energy density thereof is set to 0.1 MW/cm$^2$. And the second beam spots 1571 and 1572 are overlapped by 20 mm one another so that the length of the chained major axes of the second beam spots 1571 and 1572 may become 100 mm.

As described above, by combining a plurality of the second laser light, it is possible to enlarge the region where the first and the second laser light are overlapped and to decrease the proportion of the region having inferior crystallinity in the whole region irradiated by the laser light.

Moreover, although two laser oscillators are used to emit two of the second laser light to the processing object in this embodiment, the present invention is not limited to this, and three or more of the second laser light may be used. In addition, a plurality of the first laser light may be also employed.

In the laser irradiation chamber 1513, the processing object 1514 is mounted on a stage 1515 whose position is controlled by three uniaxial robots 1516, 1517, and 1518. Specifically, the stage 1515 can be rotated in the horizontal plane by the uniaxial robot 1516 for φ axis. In addition, the stage 1515 can be moved in X axis direction in the horizontal plane by the uniaxial robot 1517 for X axis. Furthermore, the stage 1515 can be moved in Y axis direction in the horizontal plane by the uniaxial robot 1518 for Y axis. It is a central processing device 1519 that controls the operation of the means for controlling the position.

The aggregation of the crystal grains extending long in the scanning direction can be formed by scanning the processing object in X direction while irradiating the linear beam spot extended long in Y-axis direction. The scanning speed may be set in the range of 10 to 2000 mm/s for example, preferably in the range of 100 to 1000 mm/s though the optimum range of the scanning speed depends on the conditions such as the thickness and the material of the semiconductor film. Thus, the single-crystal grains grown in the scanning direction can be formed in a paved state in the region having a width of 100 mm extending in the scanning direction. The width of the region where the crystal grains grown in the scanning direction are paved is about 100 times broader than that of the region crystallized only by the continuous wave laser light according to the conventional technique.

It is noted that a monitor 1512 with the use of a photo acceptance unit such as CCD may be provided in order to control the exact position of the processing object 1514 as shown in this embodiment.

Embodiment 2

Figure 6:
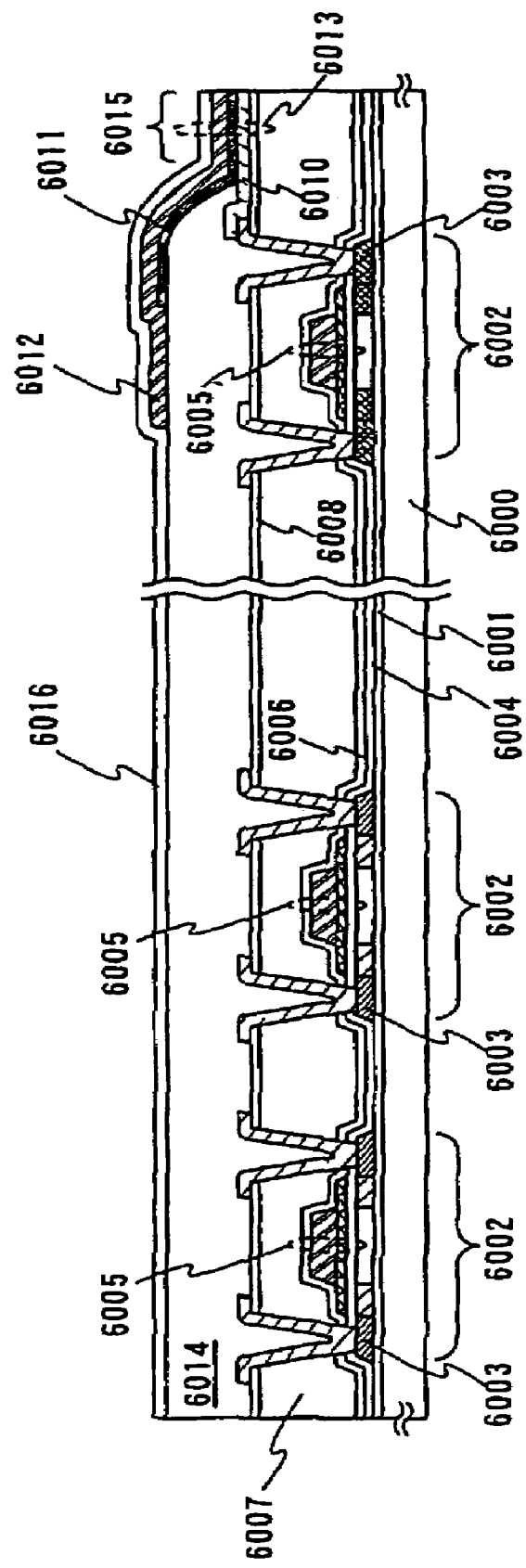
FIG. 6 is a cross-sectional view of a light-emitting device manufactured using the laser irradiation apparatus of the present invention.

This embodiment explains a structure of the pixel in the light-emitting device as one of the semiconductor devices manufactured using the laser irradiation apparatus of the present invention with reference to FIG. 6.

In FIG. 6, a base film 6001 is formed on a substrate 6000, and a transistor 6002 is formed on the base film 6001. The transistor 6002 has an active layer 6003, a gate electrode 6005, and a gate insulating film 6004 sandwiched between the active layer 6003 and the gate electrode 6005.

A poly-crystalline semiconductor film crystallized by using the laser irradiation apparatus of the present invention is employed as the active layer 6003. It is noted that not only silicon but also silicon germanium may be used as the active layer. In case of using silicon germanium, it is preferable that the concentration of germanium is in the range of 0.01 to 4.5 atomic %. In addition, silicon with carbon nitride added may be also used.

Moreover, silicon oxide, silicon nitride, or silicon oxynitride can be used as the gate insulating film 6004. In addition, the film formed by laminating those, for example the film formed by laminating SiN on $SiO_2$, may be also used as the gate insulating film. Furthermore, the gate electrode 6005 is formed of an element selected from the group consisting of Ta, W, Ti, Mo, Al, and Cu, or formed of an alloy material or a chemical compound material including the above element as its main component. Moreover, the semiconductor film, typically a poly-crystalline silicon film with the impurity element such as phosphorus doped, can be also used. And the gate electrode 6005 may be formed not only by a single conductive film but also by laminating a plurality of conductive films.

In addition, the transistor 6002 is covered by a first interlayer insulating film 6006. And a second interlayer insulating film 6007 and a third interlayer insulating film 6008 are laminated in order on the first interlayer insulating film 6006. The first interlayer insulating film 6006 may be formed of silicon oxide, silicon nitride, or silicon oxynitride in a single-layer structure or in a laminated-layer structure by a plasma CVD method or a sputtering method.

The second interlayer insulating film 6007 can be formed of an organic resin film, an inorganic insulating film, an insulating film including Si—$CH_X$ bond and Si—O bond made from the material selected from the siloxane group, or the like. In this embodiment, non-photosensitive acrylic is used. The film which is hard to transmit the material causing to promote deterioration of the light-emitting element such as moisture, oxide, and the like compared to the other insulating films is used as the third interlayer insulating film 6008. Typically it is desirable to use a DLC film, a carbon nitride film, a silicon nitride film formed by an RF sputtering method, or the like.

In FIG. 6, a reference numeral 6010 denotes an anode, a reference numeral 6011 denotes an electroluminescent layer, and a reference numeral 6012 denotes a cathode. A light-emitting element 6013 corresponds to the portion where the anode 6010, the electroluminescent layer 6011, and the cathode 6012 are overlapped. One of the transistors 6002 is a driver transistor for controlling the current supplied to a light-emitting element 6013 and it is connected to the light-emitting element 6013 directly or serially through the other circuit element. The electroluminescent layer 6011 is formed of a single light-emitting layer or formed by laminating a plurality of layers including the light-emitting layer.

The anode 6010 is formed on the third interlayer insulating film 6008. An organic resin film 6014 is formed as barrier on the third interlayer insulating film 6008. It is noted that although the organic resin film is used as the barrier in this embodiment, an inorganic insulating film, an insulating film including Si—$CH_X$ bond and Si—O bond made from the material selected from the siloxane group, or the like may be also used as the barrier. The organic resin film 6014 has an opening 6015 and the light-emitting element 6013 is formed by overlapping the anode 6010, the electroluminescent layer 6011, and the cathode 6012 in the opening.

And a protective film 6016 is formed on the organic resin film 6014 and the cathode 6012. As well as the third interlayer insulating film 6008, the film which is hard to transmit the material causing to promote deterioration of the light-emitting element such as moisture and oxide, for example a DLC film, a carbon nitride film, a silicon nitride film formed by the RF sputtering method, or the like is used as the protective film 6016.

In addition, it is desirable that the end of the opening 6015 in the organic resin film 6014 is made into a round shape so that the electroluminescent layer 6011 formed so as to partially overlap the organic resin film 6014 does not have a hole in the end thereof. Specifically, it is desirable that the radius of curvature of the curve line drawn by the sectional surface of the organic resin film in the opening is in the range of 0.2 to 2 µm. With the above structure, the coverage of the electroluminescent layer and the cathode to be formed afterward can be enhanced and therefore it can be prevented that the anode 6010 and the cathode 6012 short out in the hole formed in the electroluminescent layer 6011. Moreover, by relaxing the stress of the electroluminescent layer 6011, the defect that the light-emitting region decreases, what is called shrink, can be reduced and the reliability can be thus enhanced.

In addition, FIG. 6 shows an example in which a positive photosensitive acrylic resin is used as the organic resin film 6014. The photosensitive organic resin is classified into the positive type in which the region exposed with the energy line such as light, electron, or ion is removed, and the negative type in which the exposed region is not removed. In the present invention, the organic resin film of the negative type may be also used. Alternatively, the organic resin film 6014 may be formed of the photosensitive polyimide. When the organic resin film 6014 is formed of the acrylic of the negative type, the end section in the opening 6015 is shaped like the letter of "S." On this occasion, it is desirable that the radius of the curvature in the upper end and the lower end of the opening is in the range of 0.2 to 2 µm A transparent conductive film can be used as the anode 6010. Not only ITO, but also the transparent conductive film including indium oxide which is mixed with zinc oxide (ZnO) in the range of 2 to 20% may be used. In FIG. 6, ITO is used as the anode 6010. The cathode 6012 can be formed of the other known material when it is the conductive film whose work function is low. For example, Ca, Al, CaF, MgAg, AlLi, or the like is desirable.

It is noted that FIG. 6 shows the structure in which the light emitted from the light-emitting element is irradiated to the side of the substrate 6000. However, the structure in which the light is irradiated to the side opposite to the substrate may be also employed for the light-emitting element. In addition, although the transistor 6002 is connected to the anode 6010 of the light-emitting element in FIG. 6, the present invention is not limited to this structure, and the transistor 6002 may be connected to the cathode 6001 of the light-emitting element. In this case, the cathode is formed on the third interlayer insulating film 6008 using TiN or the like.

In fact, after the light-emitting device shown in FIG. 6 is completed, it is preferable to pack (enclose) with the use of the protective film (a laminated film, an ultraviolet curable resin film, or the like) or a light-transmissible cover member that is highly airtight and is hardly degassing in order not to be exposed to the outside air. The reliability of OLED is enhanced when the inside of the cover member is filled with the inert atmosphere or when the material having moisture-absorption characteristic (barium oxide, for example) is set in the cover member.

It is noted that although this embodiment explained the light-emitting device as one example of the semiconductor device, the semiconductor device formed by the manufacturing method of the present invention is not limited to this.

Embodiment 3

Unlike the embodiment mode 2, the present embodiment mode explains an example in which the crystallizing method by the laser irradiation apparatus of the present invention is combined with the crystallizing method by the catalyst element.

Initially, the processes from forming the semiconductor film 502 up to doping the zeroth element to the semiconductor film 502 are performed in reference to FIG. 9(A) in the embodiment mode 2. Next, as shown in FIG. 10(A), nickel acetate solution including Ni in the range of 1 to 100 ppm in weight is applied to the surface of the semiconductor film 502 by a spin coating method. It is noted that the method for adding the catalyst element is not limited to this, and the sputtering method, the vapor deposition method, the plasma process, or the like may be also employed. Next, the heating process is performed for 4 to 24 hours at temperatures ranging from 500 to 650° C., for example for 14 hours at a temperature of 570° C. This heating process forms a semiconductor film 520 in which the crystallization is promoted in the vertical direction from the surface with the nickel acetate solution applied thereon toward the substrate 500. (FIG. 10(A))

The heating process is performed for example at a temperature set to 740° C. for 180 seconds by RTA (Rapid Thermal Anneal) using radiation of the lamp as a heat source or by RTA using heated gas (gas RTA). The set temperature is the temperature of the substrate measured by a pyrometer and the measured temperature is herein defined as the temperature to be set in the heating process. As the other method, the heating process using a furnace anneal at a temperature of 550° C. for 4 hours may be also employed. It is the action of the metal element having the catalytic activity that lowers the temperature and shortens the time in the crystallization.

Although the present embodiment uses nickel (Ni) as the catalyst element, the other element such as germanium (Ge), iron (Fe), palladium (Pd), tin (Sn), lead (Pb), cobalt (Co), platinum (Pt), copper (Cu), or gold (Au) may be also used.

Figure 10:
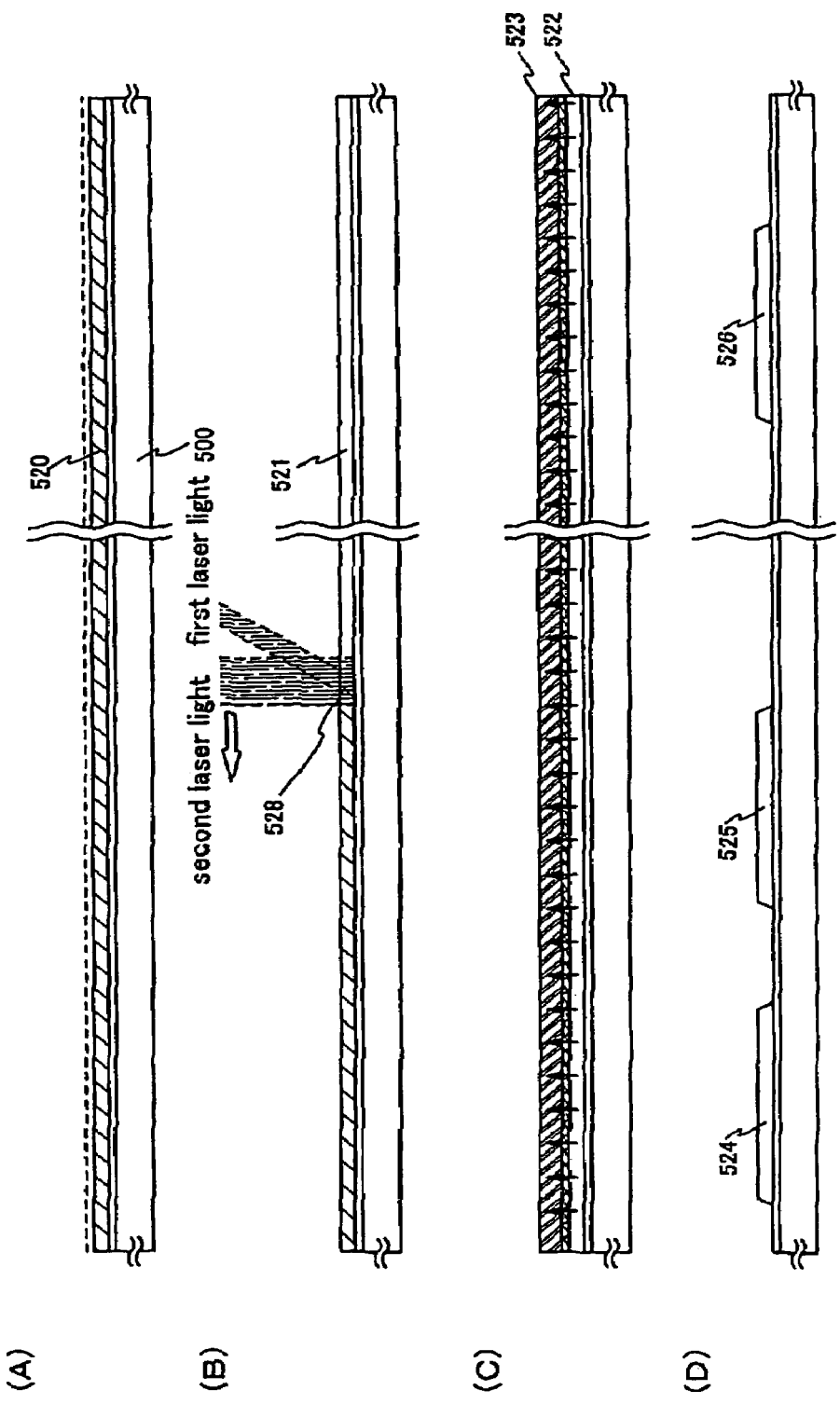
FIGS. 10A-10D are drawings illustrating a method for manufacturing a semiconductor device.

Next, as shown in FIG. 10 (B), the semiconductor film 520 is crystallized using the laser irradiation apparatus of the present invention. In this embodiment, the first laser light was pulsed excimer laser having an energy of approximately 1 J per a pulse, a frequency of 300 kHz, and a pulse width of approximately 25 nsec. Moreover, the second laser light was Nd:YAG laser having an energy of 500 W and the fundamental wave (1.064 µm).

In this embodiment, the first beam spot obtained by the first laser light and the second beam spot obtained by the second laser light are irradiated in such a way that both beam spots are scanned in the same direction and that the first beam spot falls within the second beam spot. It is noted that the magnitude relation of the beam spots is not limited to the structure shown in this embodiment. As in this embodiment, when the second beam spot is made broader than the first beam spot, it is possible to decrease considerably or to eliminate the microcrystal region in the vicinity of the edge of the beam spot as explained in the means to solve the problem. On the contrary, when the width of the first beam spot is made broader than that of the second beam spot, the region overlapped by the two laser light can be maximized. It is noted that when the adjustment by the optical system is possible, both merits can be obtained by making the two beam spots have the same width in the direction perpendicular to the scanning direction.

The semiconductor film 521 whose crystallinity is further enhanced is formed by irradiating the semiconductor film 520 with the laser light as described above. It is noted that the catalyst element (Ni here) is supposed to be included at a concentration of approximately $1 \times 10^{19}$ atoms/cm$^3$ inside the semiconductor film 521 crystallized using the catalyst element. Next, the catalyst element existing in the semiconductor film 521 is gettered.

Initially, an oxide film 522 is formed on the surface of the semiconductor film 521 as shown in FIG. 10(C). By forming the oxide film 522 having a thickness from 1 nm to 10 nm, the surface of the semiconductor film 521 can be prevented from becoming rough in the following etching process. The oxide film 522 can be formed by the known method. For example, the oxide film 522 may be formed by oxidizing the surface of the semiconductor film 521 with ozone water or with the solution in which hydrogen peroxide solution is mixed with sulfuric acid, hydrochloric acid, nitric acid, or the like. Alternatively, the oxide film 522 may be formed by the plasma process, heating process, ultraviolet ray irradiation, or the like in the atmosphere including oxygen. Moreover, the oxide film may be separately formed by the plasma-CVD method, the sputtering method, the vapor deposition method, or the like.

A semiconductor film 523 for the gettering including the noble gas element not less than $1 \times 10^{20}$ atoms/cm$^3$ is formed in a thickness from 25 nm to 250 nm on the oxide film 522 by the sputtering method. It is desirable that the mass density of the semiconductor film 523 for the gettering is lower than that of the semiconductor film 521 in order to increase the selecting ratio to the semiconductor film 521 when being etched. As the noble gas element, one kind or plural kinds selected from the group consisting of helium (He), neon (Ne), argon (Ar), krypton (Kr), and xenon (Xe) are used.

Next the gettering is performed through the heating process using the furnace annealing method or the RTA method. When the furnace annealing method is employed, the heating process is performed for 0.5 to 12 hours at temperatures ranging from 450 to 600° C. in the atmosphere of nitrogen. When the RTA method is employed, a lamp light source for heating is turned on for 1 to 60 seconds, preferably for 30 to 60 seconds, which is repeated from 1 to 10 times, preferably from 2 to 6 times. Although the lamp light source may have any luminance intensity, the luminance intensity is set so that the semiconductor film is heated instantaneously at temperatures ranging from 600 to 1000° C., preferably from 700 to 750° C.

Through the heating process, the catalyst element inside the semiconductor film 521 moves to the semiconductor film 523 for the gettering due to the diffusion as indicated with an arrow, and the catalyst element is thus gettered.

Next, the semiconductor film 523 for the gettering is removed by etching selectively. The etching process is performed by dry etching with $ClF_3$ not applying plasma, or by wet etching with alkali solution such as the solution including hydrazine or tetraethylammonium hydroxide (chemical formula $(CH_3)_4NOH$). On this occasion, the oxide film 522 can prevent the semiconductor film 521 from being etched.

Next, after the oxide film 522 is removed by hydrofluoric acid, the semiconductor film 521 is patterned to form island-shaped semiconductor films 524 to 526. (FIG. 10(D)) With the island-shaped semiconductor films 524 to 526, various kinds of semiconductor elements typified by TFT can be formed. It is noted that the gettering process in the present invention is not limited to the method described in this embodiment. The catalyst element in the semiconductor film may be reduced by the other method.

In the present embodiment, the crystallization is promoted in such a way that the crystal formed in the crystallization by the catalyst element remains without being melted by the irradiation of the laser light in the side closer to the substrate and the crystallization is promoted by having the crystal as its crystal nucleus. As a result, the crystallization by the irradiation of the laser light is easy to be promoted from the substrate side to the surface uniformly, and moreover its crystal orientation can be easily uniformed. Therefore, the surface is prevented from becoming rough compared with the case of the embodiment mode 2. Thus, the variation of the characteristic of the semiconductor element to be formed afterward, typically TFT, can be more suppressed.

It is noted that this embodiment explained the structure in which the crystallization is promoted by performing the heating process after the catalyst element is added, and then the crystallinity is further enhanced by irradiating the laser light. However, the present invention is not limited to this, and the heating process may be omitted. Specifically, after adding the catalyst element, the laser light may be irradiated instead of the heating process so as to enhance the crystallinity.

Embodiment 4

This embodiment explains an example which is different from the embodiment 3 and in which the crystallizing method by the laser irradiation apparatus of the present invention is combined with the crystallizing method by the catalyst element.

Initially, the processes from forming the semiconductor film 502 up to doping the zeroth element to the semiconductor film 502 are performed with reference to FIG. 9(A) in the embodiment mode 2. Next, a mask 540 having an opening is formed on the semiconductor film 502. And the nickel acetate solution including Ni in the range of 1 to 100 ppm in weight is applied to the surface of the semiconductor film 502 by the spin coating method. It is noted that the method for adding the catalyst element is not limited to this, and the sputtering method, the vapor deposition method, the plasma process, or the like can be also employed. Applied nickel acetate solution contacts the semiconductor film 502 in the opening of the mask 540. (FIG. 11(A))

Next, the heating process is performed for 4 to 24 hours at temperatures ranging from 500 to 650° C., for example for 14 hours at a temperature of 570° C. This heating process forms a semiconductor film 530 in which the crystallization is promoted from the surface with the nickel acetate solution applied thereon as indicated with an arrow of a continuous line. (FIG. 11(A)) The method of the heating process is not limited to this, and the other method shown in the embodiment 3 may be also employed.

It is noted that the catalyst element cited in the embodiment 3 can be used as the catalyst element.

Figure 11:
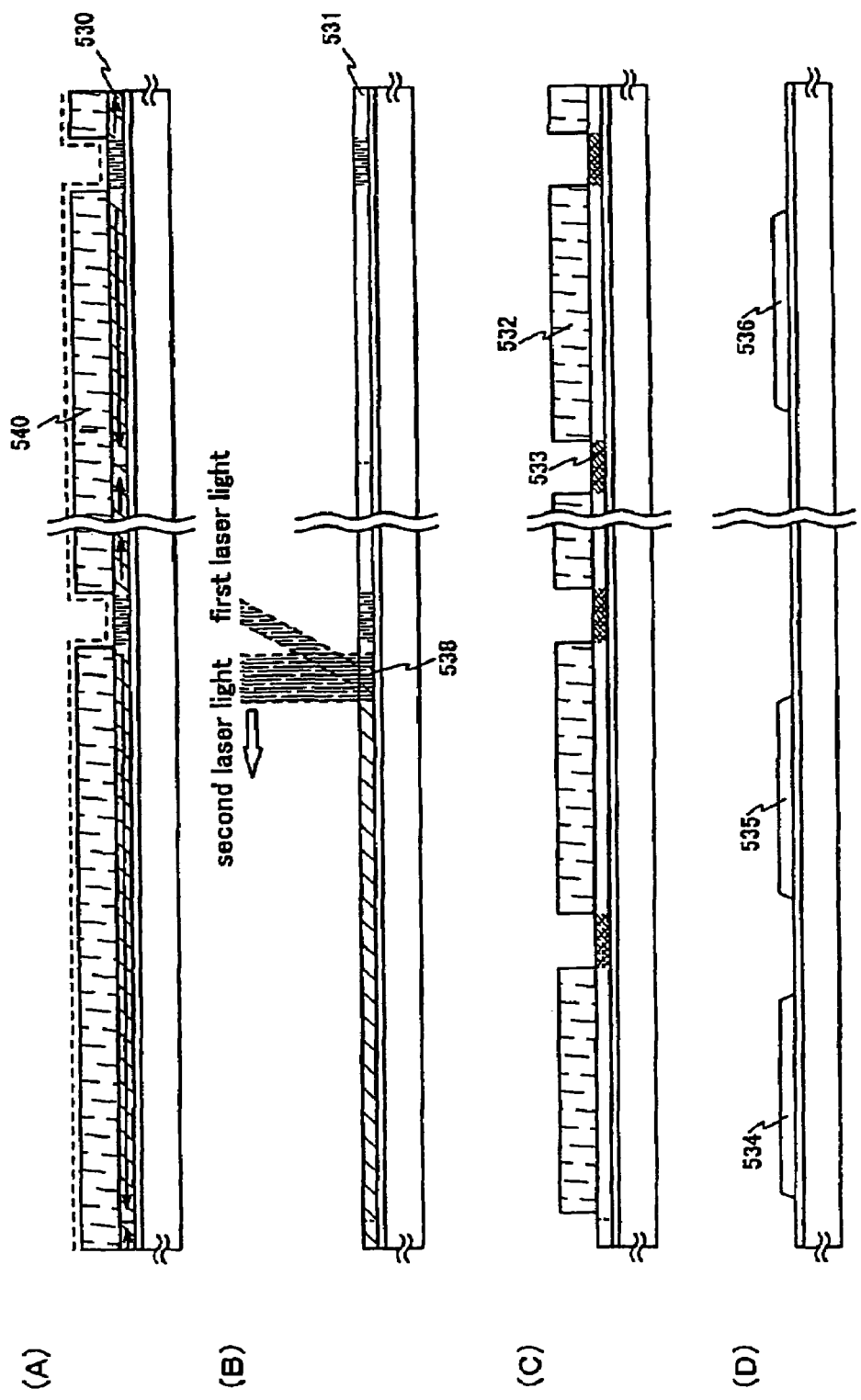
FIGS. 11A-11D are drawings illustrating a method for manufacturing a semiconductor device.

Next, after the mask 540 is removed, the semiconductor film 530 is crystallized with the use of the laser irradiation apparatus of the present invention as shown in FIG. 11(B). In this embodiment, the first laser light was YLF laser having an energy of 6 W, an energy per a pulse of 6 mJ/p, the second harmonic (527 nm), a repetition rate of 1 kHz, and a pulse width of 60 nsec. The second laser light was Nd: YAG laser light having an energy of 2000 W and the fundamental wave (1.064 μm). In this embodiment, the first beam spot obtained by the first laser light and the second beam spot obtained by the second laser light are scanned in the same direction and the width of the second beam spot in the direction perpendicular to the scanning direction is made broader than that of the first beam spot. The magnitude relation of the beam spots is not limited to this.

A semiconductor film 531 whose crystallinity is further enhanced is formed by irradiating the semiconductor film 530 with the laser light as described above.

It is noted that the semiconductor film 531 crystallized using the catalyst element as shown in FIG. 11(B) is supposed to include the catalyst element (Ni here) at a concentration of approximately $1 \times 10^{19}$ atoms/cm$^3$. Sequentially the catalyst element existing in the semiconductor film 531 is gettered.

As shown in FIG. 11(C), a silicon oxide film 532 for a mask is formed 150 nm in thickness so as to cover the semiconductor film 531. And then an opening is provided by patterning the semiconductor film 531 in order to expose a part of the semiconductor film 531. Then, phosphorous is added to provide a region 533 in which phosphorous is added in the semiconductor film 531. When the heating process is performed in this state for 5 to 24 hours at temperatures ranging from 550 to 800° C. in the atmosphere of nitrogen, for example for 12 hours at a temperature of 600° C., the region 533 with phosphorous added in the semiconductor film 531 works as a gettering site. As a result, the catalyst element remained in the semiconductor film 531 moves to the gettering region 533 with phosphorous added.

And the concentration of the catalyst element in the rest of the regions in the semiconductor film 531 can be decreased to $1 \times 10^{17}$ atoms/cm$^3$ or less by removing the region 533 with phosphorous added by means of etching. After removing the silicon oxide film 532 for the mask, the semiconductor film 531 is patterned to form island-shaped semiconductor films 534 to 536. (FIG. 11(D)) With the island-shaped semiconductor films 534 to 536, it is possible to form various kinds of semiconductor elements typified by TFT. It is noted that the gettering process in the present invention is not limited to the method shown in this embodiment. The other method may be also employed in order to decrease the catalyst element in the semiconductor film.

In this embodiment, the crystallization is promoted in such a way that the crystal formed in the crystallization by the catalyst element remains without being melted by the irradiation of the laser light in the side closer to the substrate and the crystallization is promoted by having the crystal as its crystal nucleus. As a result, the crystallization by the irradiation of the laser light is easy to be promoted from the substrate side to the surface uniformly, and moreover its crystal orientation can be easily uniformed. Thus, the surface is prevented from becoming rough compared with the case in the embodiment mode 2. Therefore, the variation of the characteristic of the semiconductor element to be formed afterward, typically TFT, can be more suppressed.

It is noted that this embodiment explained the structure in which the crystallization is promoted by performing the heating process after the catalyst element is added, and then the crystallinity is enhanced further by the irradiation of the laser light. However, the present invention is not limited to this, and the heating process may be omitted. Specifically, after adding the catalyst element, the laser light may be irradiated instead of the heating process in order to enhance the crystallinity.

Embodiment 5

This embodiment explains the timing of the laser light irradiation in a manufacturing step of a semiconductor element.

In the manufacturing method shown in the embodiment mode 2, the semiconductor film is crystallized by irradiating the laser light before patterning it into the island shape. However, the method for manufacturing a semiconductor device of the present invention is not limited to this, and a designer can determine the timing of the laser irradiation appropriately.

For example, the crystallization by the laser light irradiation may be performed after patterning the semiconductor film into the island shape. FIG. 12(A) shows an aspect in which the laser light is irradiated to an island-shaped semiconductor film 1101. A reference numeral 1102 denotes a beam spot and the beam spot 1102 is formed by overlapping the first beam spot and the second beam spot in fact. The beam spot 1102 moves relatively to the island-shaped semiconductor film 1101 toward the direction indicated with an arrow.

It is noted that the island-shaped semiconductor film may be patterned again after it is irradiated with the laser light. FIG. 12(B) shows an aspect in which the laser light is irradiated after the first patterning in the manufacturing step of the semiconductor device where the patterning is performed twice. A reference numeral 1103 denotes the island-shaped semiconductor film obtained by the first patterning, and a region 1104 shown with a dotted line in the island-shaped semiconductor film 1103 is a region to be an island-shaped semiconductor film by the second patterning after being crystallized. A reference numeral 1105 denotes a beam spot and the beam spot 1105 is formed by overlapping the first beam spot and the second beam spot in fact. The beam spot 1105 moves relatively to the island-shaped semiconductor film 1103 toward the direction indicated with the arrow. In FIG. 12(B), after the crystallization by the laser light, the second patterning is performed and thus the island-shaped semiconductor film used as the semiconductor element in fact can be obtained.

Embodiment 6

This embodiment explains one embodiment of the means for controlling a position of a substrate. FIG. 13(A) is a cross-sectional view of the means for controlling the position of the substrate, and FIG. 13(B) is a top view thereof. A reference numeral 601 denotes a stage, a reference numeral 603 denotes a conveyer for moving a substrate 602 over the stage 601, a reference numeral 604 denotes a substrate fixator for fixing one end of the substrate 602 to the conveyer, a reference numeral 606 denotes a stage transporter for controlling the position of the stage, and a reference numeral 607 denotes means for recognizing the position of the substrate (a camera equipped with CCD is used in this embodiment).

FIG. 13(C) is an enlarged view of the stage 601 shown in FIG. 13(A). As shown in FIG. 13(C) in this embodiment, the substrate 602 can be floated from the stage 601 like a hovercraft and be kept horizontally by spewing gas such as air, nitrogen, or oxygen from an opening 605 provided in the surface of the stage 601. And the substrate 602 can be moved over the stage 601 by controlling the position of the substrate fixator 604 with the use of the conveyer 603.

In addition, the stage transporter 606 can move the stage 601 in the direction intersecting with the direction of the substrate fixator 604 moved by the conveyer 603 (preferably in the perpendicular direction). And, as shown in FIG. 13(B), the whole surface of the substrate 602 can be irradiated with the laser light by making the direction of the fixator moved by the conveyer 603 perpendicular to the direction moved by the stage 601.

In addition, although the means for recognizing the position of the substrate is not always necessary, the means for recognizing the position of the substrate can control the irradiation position of the laser light on the substrate 602 accurately. Therefore, it is possible to omit the scanning of the laser light in the region not requiring to be crystallized. For example, as a method for manufacturing a semiconductor device shown in the embodiment 5, in the case where the crystallization by the laser light is performed after patterning the semiconductor film into the island shape, it is possible to omit the scanning of the laser light in the region where the island-shaped semiconductor film does not exist. Therefore, the processing time taken for a single substrate can be greatly shortened.

Embodiment 7

This embodiment explains one embodiment of the method for overlapping the first beam spot and the second beam spot.

FIG. 14(A) shows a structure of the laser irradiation apparatus of this embodiment. Four of the laser light obtained from four oscillators 1401 to 1404 are overlapped in this embodiment. The oscillators 1401 and 1403 emit continuous wave laser light of the fundamental wave. The oscillators 1402 and 1404 emit pulsed laser light of the harmonic. The shapes of the beam spots of the laser light oscillated from the oscillators 1401 to 1404 are controlled by optical systems 1405 to 1408 respectively and the laser light are condensed on a substrate 1410.

FIG. 14(B) shows the shape of the beam spot formed on the substrate 1410 by the laser irradiation apparatus shown in FIG. 14(A). The beam spot shown in FIG. 14(B) is formed by overlapping four beam spots obtained by four of the laser light. Specifically, the continuous wave laser light of the fundamental wave oscillated from the oscillator 1401 is irradiated to a region shown by a reference numeral 1411. The pulsed laser light of the harmonic oscillated from the oscillator 1402 is irradiated to a region shown by a reference numeral 1412. The continuous wave laser light of the fundamental wave oscillated from the oscillator 1403 is irradiated to a region shown by a reference numeral 1413. The pulsed laser light of the harmonic oscillated from the oscillator 1404 is irradiated to a region shown by a reference numeral 1414. And the beam spots are scanned in the same direction, which is the direction perpendicular to the major axis of each region as indicated with a white arrow in this embodiment.

In addition, the crystal having a large grain size can be formed in the region overlapped by a first region obtained by overlapping the region 1412 and the region 1414, and a second region obtained by overlapping the region 1411 and the region 1413. In this embodiment, the first region obtained by overlapping the region 1412 and the region 1414 is included in the second region obtained by overlapping the region 1411 and the region 1413. It is noted that the magnitude relation between the first region and the second region is not limited to the structure shown in this embodiment. The width of the second region corresponding to the laser light of the fundamental wave in the direction perpendicular to the scanning direction may be either broader or narrower than that of the first region corresponding to the laser light of the harmonic. In the former case, the microcrystal region in the vicinity of the edge can be drastically decreased or eliminated. In the latter case, the region where the crystal having a large grain size is obtained can be secured to the maximum. It is noted that when the first region and the second region have the same width in the direction perpendicular to the scanning direction, both merits described above can be obtained.

Embodiment 8

This embodiment explains another embodiment of the method for overlapping the first beam spot and the second beam spot.

Figure 15:
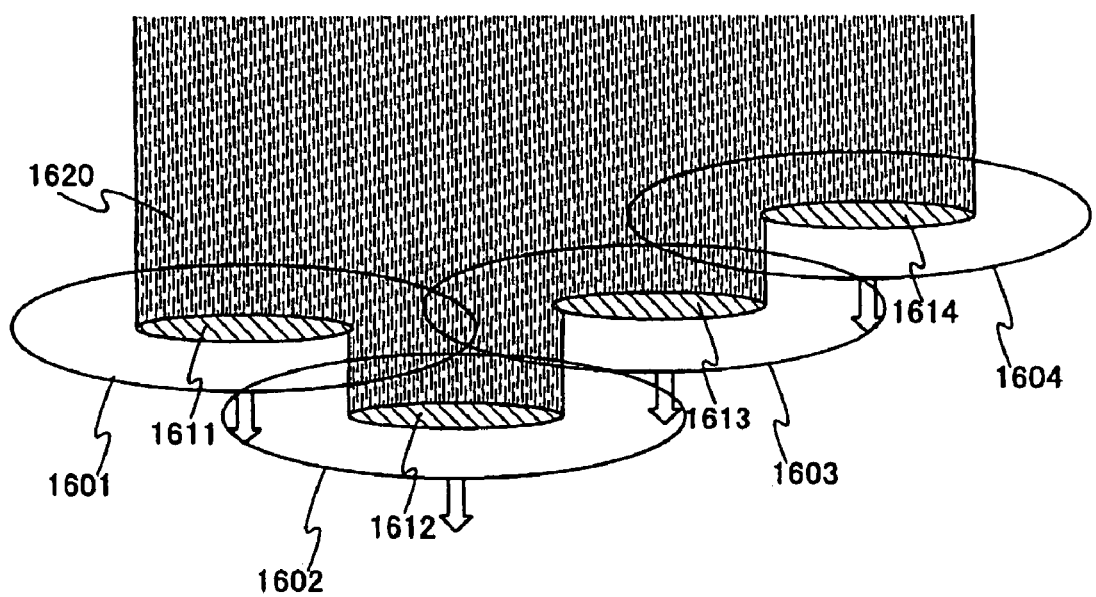
FIG. 15 is a drawing illustrating one embodiment of the method for overlapping the beam spot.

In this embodiment, the laser light irradiation is performed using a plurality of the beam spots obtained by overlapping the first laser light generated in a pulse oscillation of the harmonic and the second laser light generated in a continuous wave oscillation. An example of the layout of the beam spots in this embodiment is shown in FIG. 15. Although four beam spots (1601 to 1604) obtained by overlapping the first laser light and the second laser light are used in FIG. 15, the number of the beam spots is not limited to this. All of four beam spots are scanned in the same direction.

Specifically, the beam spots 1601 to 1604 are formed so that the beam spots (irradiated region) 1611 to 1614 formed by the first laser light overlap in the beam spots formed by the second laser light. Therefore, in this embodiment, the beam spots 1611 to 1614 of the first laser light correspond to the region where the first laser light and the second laser light are overlapped. A region 1620 where the crystal having a large grain size exists can be obtained in the irradiated regions 1611 to 1614 by the first laser light.

In this embodiment, the major axes of the four beam spots 1601 to 1604 do not correspond to each other. However, the beam spots 1601 to 1604 of the second laser light are overlapped with the adjacent beam spot one another, and moreover, the regions to be crystallized by the irradiated regions 1611 to 1614 by the first laser light are overlapped each other. In this embodiment, since the laser light is hard to be absorbed in the region of the semiconductor film where the beam spots 1601 to 1604 do not overlap the irradiated regions 1611 to 1614 by the first laser light, the microcrystal region is hard to be formed in such a region. Therefore, the region 1620 where the crystal having a large grain size exists can be formed continuously. And since the major axes of the four beam spots 1601 to 1604 do not have to be corresponded each other, it is comparatively easy to adjust the optical system.

Embodiment 9

This embodiment explains one embodiment of the optical system included in the laser irradiation apparatus of the present invention.

Figure 16:
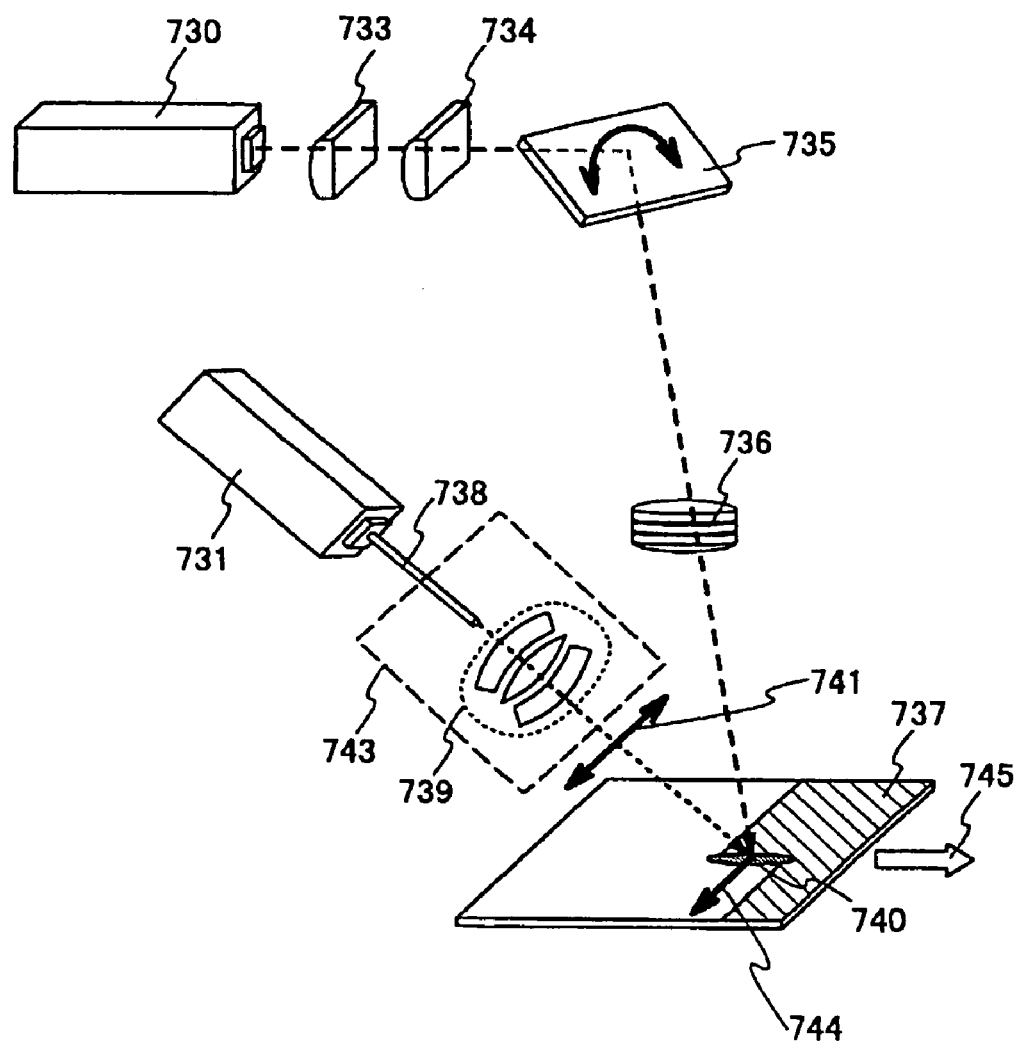
FIG. 16 is a drawing illustrating the structure of the laser irradiation apparatus of the present invention.

In FIG. 16, a reference numeral 730 denotes a laser oscillator oscillating the first laser light. A pulsed YLF laser having an output power of 6 W, a repetition rate of 1 kHz, a pulse width of 60 nsec, and a second harmonic (wavelength 532 nm) is used as the laser oscillator 730. It is noted that although the second harmonic is used in FIG. 16, the present invention is not limited to this, and the other higher harmonic may be also used. In addition, a reference numeral 731 denotes a laser oscillator oscillating the second laser light. A continuous wave Nd: YAG laser having the fundamental wave (wavelength 1.064 μm) and an output power of 2 kW is used as the laser oscillator 731 in FIG. 16. It is desirable that the first and the second laser light obtained from the laser oscillators 730 and 731 are $TEM_{00}$ mode (single mode).

The first laser light oscillated from the laser oscillator 730 is shaped into elliptical by a beam expander including two cylindrical lenses 733 and 734. After that, the first laser light is reflected by a galvanometer mirror 735 and is condensed through an fθ lens 736 so as to be irradiated to a semiconductor film 737 formed over the substrate.

After the second laser light oscillated from the laser oscillator 731 is transmitted through an optical fiber 738 of 0.6 mm φ, it is condensed so as to be elliptical through a convex lens 739, and then it is irradiated to the semiconductor film 737 formed over the substrate.

A beam spot 740 is formed by overlapping the first beam spot obtained by the first laser light and the second beam spot obtained by the second laser light. It is noted that the beam spot can be condensed so as to have an elliptical shape by making the incidence angle not to 0° but to 50° or more. The second beam spot is shaped into elliptical for example having a length of 0.6 mm in the minor axis and a length of 3 mm in the major axis, and the first beam spot has a length of 0.2 mm in the minor axis and a length of 3 mm in the major axis for example in this embodiment.

The second beam spot can be scanned on the semiconductor film 737 by moving the optical fiber 738 and the convex lens 739 in the direction indicated with an arrow 741. Since the optical fiber 738 is flexible, it is possible to transform the optical fiber 738 and to move the convex lens 739 and a part of the optical fiber 738 including the exit (the part shown by a dotted line 743) in the direction indicated with the arrow 741 while fixing the direction and the position of the exit of the optical fiber 738 with respect to the convex lens 739. With such a movement, the second beam spot can be scanned along the direction indicated with an arrow 744. In addition, the first beam spot can be scanned along the direction shown with the arrow 744 by changing an angle of the galvanometer mirror 735. Moreover, it is possible to suppress the change of the shape of the first beam spot due to the change of the angle of the galvanometer mirror 735 as much as possible by using the fθ lens 736. With the above structure, it is possible to scan the beam spot 740 obtained by the first beam spot and the second beam spot in the direction indicated with the arrow 744 with respect to the semiconductor film 737.

And, in the present embodiment mode, in addition to the scanning in the direction indicated with the arrow 744, the semiconductor film 737 can be scanned in the direction indicated with a white arrow 745 by using a uniaxial stage. Thus, the whole surface of the semiconductor film 737 can be irradiated with the first laser light and the second laser light. The directions indicated with the arrow 744 and the white arrow 745 preferably intersect, and more preferably, they are orthogonalized. In this embodiment, the scanning speed of the first and the second laser light is set to 500 mm/sec for example.

It is noted that the optical system used in the laser irradiation apparatus of the present invention is not limited to the structure shown in the present embodiment mode.

What is claimed is:

1. A method for manufacturing a semiconductor device comprising the step of:

crystallizing a semiconductor film formed over an insulating surface by irradiating first laser light generated in a pulse oscillation having a wavelength not longer than that of visible light and second laser light generated in a continuous wave oscillation, wherein when the first laser light and the second laser light are irradiated, a region irradiated by the first laser light and a region irradiated by the second laser light are overlapped in such a way that an entirety of the region irradiated by the first laser light falls within the region irradiated by the second laser light, wherein the second laser light has a fundamental wave, and wherein the second laser light is a solid-state laser light.

2. A method for manufacturing a semiconductor device comprising the step of:

crystallizing a semiconductor film formed over an insulating surface by irradiating first laser light generated in a pulse oscillation having a wavelength not longer than that of visible light and second laser light generated in a continuous wave oscillation, wherein when the first laser light and the second laser light are irradiated, a region irradiated by the first laser light and a region irradiated by the second laser light are overlapped in such a way that an entirety of the region irradiated by the first laser light falls within the region irradiated by the second laser light, wherein the semiconductor film melts in the region irradiated by the first laser light, wherein the second laser light has a fundamental wave, and wherein the second laser light is a solid-state laser light.

3. A method for manufacturing a semiconductor device comprising the step of:

crystallizing a semiconductor film formed over an insulating surface by irradiating first laser light generated in a pulse oscillation having a wavelength not longer than that of visible light and second laser light generated in a continuous wave oscillation, wherein when the first laser light and the second laser light are irradiated, a region irradiated by the first laser light and a region irradiated by the second laser light are overlapped in such a way that the region irradiated by the first laser light falls within the region irradiated by the second laser light, wherein in the region irradiated by the first laser light, the semiconductor film melts partially by the first laser light and the semiconductor film melts completely by the second laser light, wherein the second laser light has a fundamental wave, and wherein the second laser light is a solid-state laser light.

4. The method for manufacturing a semiconductor device according to claim 1, wherein the first laser light has a second harmonic.

5. The method for manufacturing a semiconductor device according to claim 1, wherein the semiconductor film formed over the insulating surface is crystallized by a heating process using a catalyst metal.

6. The method for manufacturing a semiconductor device according to claim 5, wherein the heating process is performed using a gas RTA.

7. The method for manufacturing a semiconductor device according to claim 2, wherein the first laser light has a second harmonic.

8. The method for manufacturing a semiconductor device according to claim 2, wherein the semiconductor film formed over the insulating surface is crystallized by a heating process using a catalyst metal.

9. The method for manufacturing a semiconductor device according to claim 8, wherein the heating process is performed using a gas RTA.

10. The method for manufacturing a semiconductor device according to claim 3, wherein the first laser light has a second harmonic.

11. The method for manufacturing a semiconductor device according to claim 3, wherein the semiconductor film formed over the insulating surface is crystallized by a heating process using a catalyst metal.

12. The method for manufacturing a semiconductor device according to claim 11, wherein the heating process is performed using a gas RTA.

13. A method for manufacturing a semiconductor device comprising the step of:

performing a heating process using a gas RTA to a semiconductor film, crystallizing the semiconductor film formed over an insulating surface by irradiating first laser light generated in a pulse oscillation having a wavelength not longer than that of visible light and second laser light generated in a continuous wave oscillation, wherein when the first laser light and the second laser light are irradiated, a region irradiated by the first laser light and a region irradiated by the second laser light are overlapped in such a way that the region irradiated by the first laser light falls within the region irradiated by the second laser light, wherein the second laser light has a fundamental wave, and wherein the second laser light is a solid-state laser light.

14. The method for manufacturing a semiconductor device according to claim 13, wherein the first laser light has a second harmonic.

* * * * *